(12) United States Patent
Segev et al.

(10) Patent No.: US 10,123,375 B2
(45) Date of Patent: Nov. 6, 2018

(54) APPARATUS, SYSTEM AND METHOD OF DETERMINING ONE OR MORE LINK ADAPTATION PARAMETERS

(71) Applicant: INTEL IP CORPORATION, Santa Clara, CA (US)

(72) Inventors: Jonathan Segev, Tel Mond (IL); Robert Stacey, Portland, OR (US); Yaron Alpert, Hod Hasharon (IL)

(73) Assignee: INTEL IP CORPORATION, Santa Clara, CA (US)

( * ) Notice: Subject to any disclaimer, the term of this patent is extended or adjusted under 35 U.S.C. 154(b) by 132 days.

(21) Appl. No.: 15/200,026

(22) Filed: Jul. 1, 2016

(65) Prior Publication Data

US 2017/0215221 A1    Jul. 27, 2017

Related U.S. Application Data

(60) Provisional application No. 62/281,336, filed on Jan. 21, 2016.

(51) Int. Cl.
*H04W 4/00* (2018.01)
*H04W 76/25* (2018.01)
(Continued)

(52) U.S. Cl.
CPC .......... *H04W 76/25* (2018.02); *H04B 5/0037* (2013.01); *H04B 17/318* (2015.01);
(Continued)

(58) Field of Classification Search
CPC ..... H04W 24/00; H04W 84/12; H04W 88/08; H04W 80/04; H04W 88/06; H04W 84/18;
(Continued)

(56) References Cited

U.S. PATENT DOCUMENTS

2004/0176111 A1\*  9/2004  Wilhelm .............. H04L 1/0003
                                                           455/456.6
2014/0112183 A1     4/2014  Yang et al.

FOREIGN PATENT DOCUMENTS

| KR | 20140092295 | 7/2014 |
| WO | 2009029157  | 3/2009 |
| WO | 2011087197  | 7/2011 |

OTHER PUBLICATIONS

International Search Report and Written Opinion for PCT/US2016/067681, dated Mar. 29, 2017, 13 pages.

(Continued)

*Primary Examiner* — Brenda H Pham
(74) *Attorney, Agent, or Firm* — Shichrur & Co.

(57) ABSTRACT

Some demonstrative embodiments include apparatuses, devices, systems and methods of determining one or more link adaptation parameters. For example, an apparatus may be configured to process a first message from a wireless station, the first message including location information corresponding to a location of the wireless station, and an Access Point (AP) identifier to identify an AP; to query a Location-Based Link Status (LB-LS) database (DB) for radio link information corresponding to the AP and to the location; to determine, based on the radio link information, one or more link adaptation parameters corresponding to a wireless link between the AP and the wireless station at the location; and to send to the wireless station a second message comprising the one or more link adaptation parameters.

17 Claims, 7 Drawing Sheets

(51) Int. Cl.
| | |
|---|---|
| H04W 4/02 | (2018.01) |
| H04B 17/318 | (2015.01) |
| H04L 5/00 | (2006.01) |
| H04B 5/00 | (2006.01) |
| H04W 36/38 | (2009.01) |
| H04W 28/18 | (2009.01) |
| H04W 72/00 | (2009.01) |
| H04W 88/02 | (2009.01) |
| H04W 88/08 | (2009.01) |
| H04B 7/06 | (2006.01) |

(52) U.S. Cl.
CPC .............. *H04L 5/006* (2013.01); *H04W 4/023* (2013.01); *H04W 28/18* (2013.01); *H04W 36/38* (2013.01); *H04W 72/00* (2013.01); H04B 7/0617 (2013.01); H04B 7/0697 (2013.01); *H04W 88/02* (2013.01); *H04W 88/08* (2013.01)

(58) Field of Classification Search
CPC ..... H04L 43/50; H04L 43/0852; H04L 43/08; H04L 2012/5608; H04B 17/003
USPC ..... 370/252, 310.2, 328, 338, 332, 333, 349
See application file for complete search history.

(56) References Cited

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Preliminary Report on Patentability for International Application No. PCT/US2016/067681, dated Aug. 2, 2018, 10 pages.

* cited by examiner

APPARATUS, SYSTEM AND METHOD OF DETERMINING ONE OR MORE LINK ADAPTATION PARAMETERS

CROSS REFERENCE

This Application claims the benefit of and priority from U.S. Provisional Patent Application No. 62/281,336 entitled "APPARATUS, SYSTEM AND METHOD OF GENERATING AND USING LOCATION-BASED LINK STATUS INFORMATION", filed Jan. 21, 2016, the entire disclosure of which is incorporated herein by reference.

TECHNICAL FIELD

Embodiments described herein generally relate to determining one or more link adaptation parameters.

BACKGROUND

Some wireless communication technologies, for example, according to an IEEE 802.11 Specification may provide various techniques, for example, Multi-In-Multi-Out (MIMO), beamforming, spatial frequency reuse, and the like, which may be configured to allow one or more advantages, e.g., increased throughput, and/or spectrally efficient wireless connectivity.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
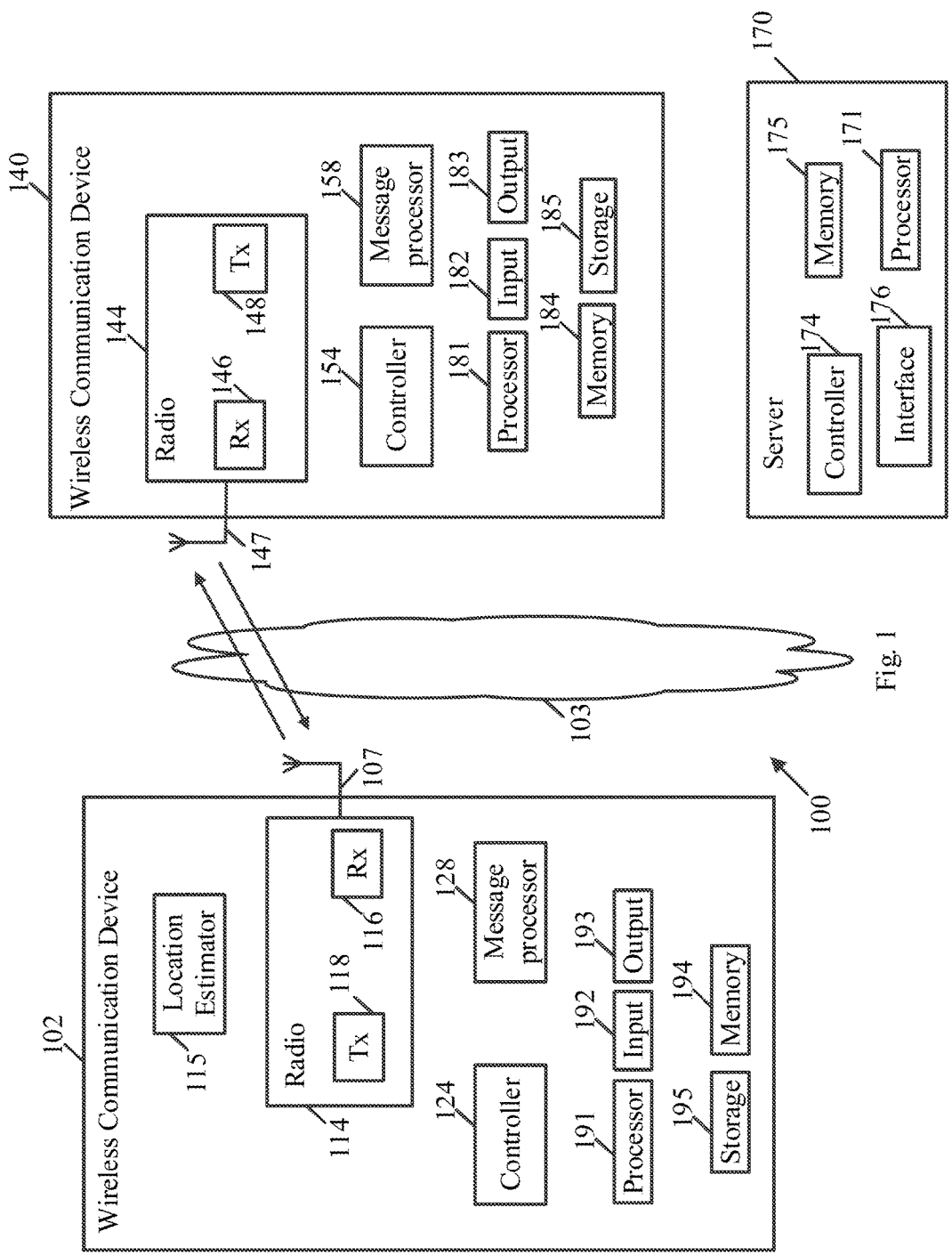
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical*

Layer (*PHY*) *Specifications—Amendment 4: Enhancements for Very High Throughput for Operation in Bands below 6 GHz*", December, 2013); *IEEE* 802.11*ad* ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60GHz Band*", Dec. 28, 2012); IEEE-802.11REVmc ("*IEEE 802.11-REVmc™/D6.0, June 2016 draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*); and/or IEEE 802.11az (*IEEE 802.11az, Next Generation Positioning*)) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1, April 2011, Final specification*) and/or future versions and/or derivatives thereof, devices and/or networks operating in accordance with existing WiFi Alliance (WFA) Peer-to-Peer (P2P) specifications (including *WiFi P2P technical specification, version 1.5, August 4, 2014*; and/or *Wi-Fi Neighbor Awareness Networking (NAN) Technical Specification, Version 1.0, May 1, 2015*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 or 5 Gigahertz (GHz). However, other embodiments may be implemented utilizing any other suitable wireless communication frequency bands, for example, a 60 GHz band, a millimeterWave (mmWave) frequency band, a Sub 1 GHz (S 1G) frequency band, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102, and/or a wireless communication device 140.

In some demonstrative embodiments, wireless medium 103 may include, for example, a radio channel, an RF channel, a Wireless Fidelity (WiFi) channel, a cellular channel, an IR channel, and the like. One or more elements of system 100 may optionally be capable of communicating over any suitable wired communication links.

In some demonstrative embodiments, device 102 may include a mobile or a portable device.

In some demonstrative embodiments, device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 140 may include, or may perform the functionality of, an Access Point (AP) station (STA).

In some demonstrative embodiments, device 140 may include a non-mobile or a static device.

In some demonstrative embodiments, device 140 may include, for example, a desktop computer, a router, a server, and/or any other device configured to perform the functionality of an AP.

In other embodiments, device 140 may include, or may perform the functionality of a non-AP STA.

In some demonstrative embodiments, device 102 may perform the functionality of a non-AP STA, and/or device 140 may perform the functionality of an AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication medium 103 may include a wireless communication channel over a 2.4 GHz frequency band, a 5 GHz frequency band, a millimeterWave (mmWave) frequency band, e.g., a 60 GHz frequency band, a S1G band, and/or any other frequency band.

In some demonstrative embodiments, wireless communication devices 102 and/or 140 may form, and/or communicate as part of, a wireless local area network (WLAN).

In some demonstrative embodiments, wireless communication devices 102 and/or 140 may form, and/or communicate as part of, a WiFi network.

In some demonstrative embodiments, wireless communication devices 102 and/or 140 may form, and/or communicate as part of, a WiFi Direct (WFD) network, e.g., a WiFi direct services (WFDS) network, and/or may perform the functionality of one or more WFD devices.

In other embodiments, wireless communication devices 102 and/or 140 may form, and/or communicate as part of, any other network and/or perform the functionality of any other wireless devices or stations.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other network.

In some demonstrative embodiments, device 102 may include a location estimator 115 configured to estimate a location of device 102, e.g., as described below.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, devices 102 and/or 140 may be configured to perform, allow, and/or support, positioning, for example, WiFi positioning, e.g., next generation positioning, for example, to be implemented by and/or supported by an *IEEE* 802.11 *Specification*, e.g., an *IEEE* 802.11*az Specification*, and/or any other specification, standard, and/or protocol.

In some demonstrative embodiments, devices 102 and/or 140 may be configured to perform one or more operations of a location protocol, for example, Fine Timing Measurement (FTM) protocol and/or any other location or positioning protocol, which may use, for example, a RTT (Round Trip Time) based range measurement, a Time of Flight (ToF) measurement, and/or any other measurement.

In some demonstrative embodiments, a location protocol or a positioning protocol may be utilized for one or more purposes, for example, in addition to, or instead of indoor location usages, e.g., as described below.

For example, as Wireless Local Area Network (WLAN) techniques, e.g., according to one or more *IEEE* 802.11 *Specifications*, progress, radio techniques, such as, for example, Multi-In-Multi-Out (MIMO), beamforming, spatial frequency reuse, a power control, OFDMA, and others, may become predominant of a radio interface. Such techniques may enable, for example, at least high throughput, spectrally efficient wireless connectivity, and/or one or more additional or alternative benefits and/or advantages. However, these techniques may make it difficult for wireless stations (STAs), which are not yet associated with an AP, or are interacting with one AP, to measure a link budget to another AP, for example, as only limited transmission and reception information may exist.

Furthermore, it may be difficult for the STAs to extract from a current radio link condition of a wireless link, for example, whether the wireless link is expected to improve or decay over time, for example, as statistics may be noisy, and/or as link budget may trend mostly visible on semi-dynamic low mobility cases.

In some demonstrative embodiments, devices 102 and/or 140 may be configured to generate, communicate and/or process location-based radio link information, e.g., as described below.

In some demonstrative embodiments, devices 102 and/or 140 may be configured to generate, communicate and/or process location-based radio link information, for example, at least for improving link adaptation, e.g., uplink (UL) and/or downlink (DL) link adaptation, improving resource allocation, for example, scheduling, for one or more additional or alternative benefits and/or purposes, and/or for one or more operations and/or mechanisms.

In some demonstrative embodiments, a device, e.g., device 102 and/or device 140, may be configured to generate and/or use location based radio link information, for example, according to a mechanism, which may be based on or a flavor of, Location Based Link Status (LB-LS) information, e.g., in accordance with an *IEEE* 802.11 *Specification*.

In some demonstrative embodiments, a device, e.g., device 102, may be configured to collect radio link information at a location, and to determine a location at which the device collects the link information, for example, using a location and/or positioning protocol and/or mechanism.

In one example, the device may use an FTM procedure, e.g., in accordance with an *IEEE* 802.11 *Specification*, and/or any other protocol, which may allow the determination and/or estimation of the location of the device collecting the radio link information. For example, location estimator 115 may use the FTM protocol, e.g., to determine the location of device 102.

In some demonstrative embodiments, the FTM procedure may be implemented, e.g., by device 102, for example, for range measurement and/or trilateration based location, e.g., in accordance with an *IEEE* 802.11 *Specification*.

In some demonstrative embodiments, a unicast range measurement procedure, e.g., such as the FTM procedure, which may be used for range measurement, may be, for example, linear medium usage dependent of a number of locating STAs.

In some demonstrative embodiments, a STA may determine a location of the STA, for example, from messages of an FTM procedure executed between two APs, for example, by calculating intersection of multiple hyperboles.

In other embodiments, any other location, ranging and/or positioning methods and/or procedures may be used. In one example, a non-unicast mechanism, for example, hyperbolic positioning, e.g., based on Differential Time Of Arrival (DTOA), may be used.

In some demonstrative embodiments, the DTOA mechanism may be, for example, medium usage independent of a number of locating STAs.

In some demonstrative embodiments, the location-based radio link information may include, or may be in the form of, Location Based Link Status (LB-LS) information, and/or any other type and/or form of information.

In some demonstrative embodiments, devices 102 and/or 140 may be configured to allow using location-based radio link information, for example, in the form of LB-LS information, to determine and/or set link adaptation and/or resource allocation for one or more STAs, for example, based on accumulation and/or processing of reports from a plurality of STAs, for example, from a vast number of STAs, e.g., as described below.

In some demonstrative embodiments, location-based radio link information, for example, in the form of LB-LS information, may be used for, and/or may assist in, determining one or more parameters for communication by one or more STAs, e.g., as described below.

In some demonstrative embodiments, the location-based radio link information may be used for, and/or assist in, determining one or more UL and/or DL link parameters, e.g., a Modulation and Coding Scheme (MCS), a number of spatial streams (NSS), a Transmit (Tx) Power, and/or one or more additional or alternative parameters with respect to one or more UL/DL parameters, e.g., as described below.

In some demonstrative embodiments, the location-based radio link information may be used for, and/or assist in, determining a Physical Layer (PHY) level service type, e.g., a Multi-User (MU) support, a PHY mode, beam forming, and/or one or more additional or alternative parameters with respect to a PHY level service type, e.g., as described below.

In some demonstrative embodiments, the location-based radio link information may be used for, and/or assist in, determining a simultaneous MU indication, e.g., a spatial medium separation and/or a spatial medium reuse, and/or one or more additional or alternative parameters with respect to simultaneous MU communication, e.g., as described below.

In some demonstrative embodiments, the location-based radio link information may be used for, and/or assist in, determining a Media Access Control (MAC) level configuration and/or a resource allocation, e.g., as described below.

In some demonstrative embodiments, the location-based radio link information may be used for, and/or assist in, determining any other additional or alternative parameters.

In some demonstrative embodiments, devices 102 and/or 140 may be configured to implement an LB-LS service, which may be based on a location measurement, for example, according to an FTM protocol and/or any other location measurement, which may enable, for example, the determination of location based on range measurement with a small number of frame exchanges and/or at a low update rate, which, in turn, may consume a limited amount of medium resources and/or may operate in both associated and unassociated modes, e.g., as described below.

In some demonstrative embodiments, a STA, e.g., device 102, may be configured to report, for example, to an AP, e.g., device 140, a location of the STA and radio link information measured at the location of the STA, e.g., as described below.

In some demonstrative embodiments, the radio link information may include, for example, Received Signal Strength Indication (RSSI) information, Carrier to Interference Noise Ratio (CINR) information, Signal to Noise Ratio (SNR) information, and/or any additional or alternative information corresponding to a radio link at the location of the STA, e.g., as described below.

In some demonstrative embodiments, the AP, e.g., device 140, may be configured to process the report of the location and the radio link information, e.g., from one or more STAs at a plurality of locations, for example, to create location-based radio link information, for example, in the form of a radio link budget heat map, at a vicinity of the AP, for example, over time, e.g., as described below.

In some demonstrative embodiments, an RSSI heat map may be generated to represent RSSI values over a geographical region.

In one example, an RSSI heat map may be generated, for example, using reports from a plurality of STAs, e.g., as described below.

In another example, the RSSI heat map may be simulated using a mathematical model of a system and venue.

In other embodiments, a heat map may represent any other additional or alternative location-based radio link information, e.g., a CINR heat map, an SNR heat map, and/or the like.

Referring back to FIG. 1, in some demonstrative embodiments, a radio link heat map may be used, for example, to estimate the radio link budget of a STA, e.g., any STA providing its location.

In some demonstrative embodiments, some parameters, for example, CINR, SNR, and/or RSSI may be localized and/or may be affected by beam forming, while one or more other parameters, for example, antenna pattern and/or antenna directionality location, may be to a great extent unaffected by beamforming and/or may be less localized, and thus more stable.

In some demonstrative embodiments, one or more attributes, for example, the link budget heat map and/or the radio link budget, may optionally be combined as a parameter amongst one or more other metrics, for example, a STA current CINR, RSSI, SNR, and/or AP load, for example, for AP selection, handover and/or link budget control, e.g., as described below.

In some demonstrative embodiments, an AP, e.g., device 140, may be configured to determine one or more link adaptation parameters for an UL and/or DL wireless link.

In some demonstrative embodiments, device 140 may determine one or more UL link adaptation parameters for an UL wireless link to be used by a wireless station.

In some demonstrative embodiments, device 140 may include a link adaptation controller configured to determine the one or more link adaptation parameters.

In one example, controller 124 may perform the functionality of the link adaptation controller.

In another example, any other element of system 100 and/or device 140, e.g., a server or another AP, may perform the functionality of the link adaptation controller, e.g., as described below.

In some demonstrative embodiments, device 140 may be configured to send to the wireless station one or more UL link adaptation parameters to be used buy the wireless station for communication over an UL wireless link.

In some demonstrative embodiments, device 102 may request one or more link adaptation parameters to be used for a wireless link of device 102, e.g., as described below.

In some demonstrative embodiments, controller 124 may be configured to trigger, cause, instruct and/or control device 102 to send to device 140 a first message including location information corresponding to a location device 102.

In some demonstrative embodiments, controller 124 may be configured to trigger, cause, instruct and/or control device 102 and/or location estimator 115 to perform a location measurement to estimate the location of device 102.

In some demonstrative embodiments, the location measurement may include a Fine Timing Measurement (FTM).

In one example, location estimator 115 may determine the location of device 102, for example, based on the FTM protocol.

In some demonstrative embodiments, the first message may include an AP identifier to identify an AP ("the identified AP").

In some demonstrative embodiments, device 140 may receive the first message from device 102.

In some demonstrative embodiments, controller 154 may be configured to trigger, cause, instruct and/or control device 140 to process the first message including the location information corresponding to the location of device 102 and the AP identifier.

In some demonstrative embodiments, device 140 may include a Location-Based Link Status (LB-LS) database (DB) 160 configured to store radio link information. For example, LB-LS DB 160 may include radio link information corresponding to a venue including the location of the AP and the location of device 102. In one example, LB-LS DB 160 may include an RSSI heat map, and/or additional or alternative radio link information.

In some demonstrative embodiments, controller 154 may be configured to trigger, cause, instruct and/or control device 140 to query the LB-LS DB 160 for radio link information corresponding to the location of device 102 and the AP identified by the first message.

In some demonstrative embodiments, controller 154 may be configured to trigger, cause, instruct and/or control device 140 to determine one or more link adaptation parameters, e.g., UL link adaptation parameters, corresponding to a wireless link, e.g., an UL wireless link, between device 102 and the identified AP at the location of device 102, for example, based on the radio link information.

In some demonstrative embodiments, controller 154 may be configured to trigger, cause, instruct and/or control device 140 to send to the device 102 a second message including the one or more link adaptation parameters corresponding to the wireless link between device 102 and the identified AP.

In some demonstrative embodiments, the AP identifier in the first message may include an AP identifier of device 140, e.g., as described below. For example, device 140 may provide to device one or more link adaptation parameters to be used by device 102 for communicating over an UL between device 102 and device 140, e.g., as described below.

In some demonstrative embodiments, device 102 may request one or more link adaptation parameters to be used for communication over a wireless link between device 102 and another AP, for example, a neighbor AP of device 104, for example, for handover to the neighbor AP, e.g., as described below.

In some demonstrative embodiments, an AP, e.g., device 140, may be configured to determine one or more link adaptation parameters for an UL and/or DL wireless link between the AP, e.g., device 140, and a wireless station, e.g., device 102.

In some demonstrative embodiments, device 140 may determine one or more UL link adaptation parameters for an UL wireless link between device 140 and device 102, for example, to be used by device 102 to transmit data to device 140.

In some demonstrative embodiments, device 102 may request to establish a link between devices 102 and 140, for example, to transmit data to device 140, e.g., as described below.

In some demonstrative embodiments, device 140 may be configured to provide to device 102 one or more link adaptation parameters, for example, to establish the link to transmit data to device 140, e.g., as described below.

In some demonstrative embodiments, the first message from device 102 may include the AP identifier to identify an AP. In one example, the AP identifier may identify device 140.

In some demonstrative embodiments, device 140 may receive the first message from device 102.

In some demonstrative embodiments, controller 154 may be configured to trigger, cause, instruct and/or control device 140 to process the first message including the location information corresponding to the location device 102 and the AP identifier of device 140.

In some demonstrative embodiments, controller 154 may be configured to trigger, cause, instruct and/or control device 140 to query the LB-LS DB 160 for radio link information corresponding to device 140 and to the location of device 102.

In some demonstrative embodiments, the radio link information may include a Carrier to Interference Noise Ratio (CINR) at the location, a Received Signal Strength Indicator (RSSI) at the location, and/or a Signal to Noise Ratio (SNR) at the location, and/or any other any other additional or alternative radio link information.

In some demonstrative embodiments, controller 154 may be configured to trigger, cause, instruct and/or control device 140 to determine one or more link adaptation parameters, e.g., UL link adaptation parameters, corresponding to a wireless link, e.g., an UL wireless link, between device 102 and device 140, for example, based on the radio link information and the location of device 102.

In some demonstrative embodiments, the one or more link adaptation parameters may include a modulation and coding scheme (MCS) for the wireless link.

In some demonstrative embodiments, the one or more link adaptation parameters may include one or more Clear Channel Assessment (CCA) parameters to communicate over the wireless link.

In some demonstrative embodiments, the one or more link adaptation parameters may include a steering matrix or a Multi User (MU) steering matrix.

In some demonstrative embodiments, the one or more link adaptation parameters may include a transmit (Tx) power to transmit over the wireless link.

In some demonstrative embodiments, the one or more link adaptation parameters may include a Number of Spatial Streams (NSS) to communicate over the wireless link.

In some demonstrative embodiments, controller 154 may be configured to trigger, cause, instruct and/or control device 140 to send to the device 102 a second message including the one or more link adaptation parameters corresponding to the wireless link between devices 102 and 140.

In some demonstrative embodiments, device 102 may receive the second message including the one or more link adaptation parameters corresponding to the wireless link between devices 102 and 140.

In some demonstrative embodiments, controller 124 may be configured to trigger, cause, instruct and/or control device 102 to receive from device 140 the second message including the one or more link adaptation parameters corresponding to the wireless link between devices 102 and 140.

In some demonstrative embodiments, controller 124 may be configured to trigger, cause, instruct and/or control device 102 to establish the wireless link between devices 102 and 140, for example, according to the one or more link adaptation parameters.

In some demonstrative embodiments, device 102 may request link adaptation parameters of a neighbor AP, for example, for handover of device 102 from device 140 to the neighbor AP.

In some demonstrative embodiments, controller 124 may be configured to trigger, cause, instruct and/or control device 102 to send to device 140 the first message including an AP identifier of the neighbor AP.

In some demonstrative embodiments, controller 154 may be configured to trigger, cause, instruct and/or control device 140 to query the LB-LS DB 160 for radio link information corresponding to the neighbor AP and to the location of device 102.

In some demonstrative embodiments, the link adaptation parameters may include link adaptation parameters of the neighbor AP, e.g., for the handover of device 102.

In some demonstrative embodiments, device 102 may establish a wireless link between device 102 and the neighbor AP, for example, based on the one or more link adaptation parameters received from device 140.

In some demonstrative embodiments, device 140 may determine one or more DL link adaptation parameters for a DL wireless link between device 140 and device 102, for example, to transmit data from device 140 to device 102, e.g., as described below.

In some demonstrative embodiments, controller 154 may be configured to trigger, cause, instruct and/or control device 140 to query LB-LS DB 160, for radio link information corresponding to the location of device 102.

In some demonstrative embodiments, controller 154 may be configured to trigger, cause, instruct and/or control device 140 to determine one or more link adaptation parameters, e.g., DL link adaptation parameters, corresponding to a wireless link, e.g., a DL wireless link, between devices 140 and 102, for example, based on the radio link information corresponding to the location of device 102.

In some demonstrative embodiments, controller 154 may be configured to trigger, cause, instruct and/or control device 140 to determine the one or more link adaptation parameters, for example, based on a location of device 140.

In one example, device 140 may determine the one or more link adaptation parameters based on the location of device 140, for example, if device 140 is not static.

In some demonstrative embodiments, controller 154 may be configured to trigger, cause, instruct and/or control device 140 to transmit a transmission to device 102 over the DL wireless link, for example, according to the one or more link adaptation parameters.

In some demonstrative embodiments, device 140 may be configured to update LB-LS DB 160, for example, based on one or more reports from one or more wireless stations, e.g., as described below.

In some demonstrative embodiments, a station, e.g., device 102, may be configured to send a report to device 140, for example, to enable device 140 to update LB-LS DB 160.

In some demonstrative embodiments, controller 124 may be configured to trigger, cause, instruct and/or control device 102 to send a report to device 140.

In some demonstrative embodiments, the report may include an indication of the location of device 102 and measured radio link information corresponding to the location of device 102.

In some demonstrative embodiments, the measured radio link information may include the CINR at the location of device 102, the RSSI at the location of device 102, and SNR at the location of device 102. In other embodiments, the report may include any additional or alternative radio link information corresponding to the location of device 102.

In some demonstrative embodiments, device 140 may send a report request message to device 102, for example, to request device 102 to send the report.

In some demonstrative embodiments, controller 124 may be configured to trigger, cause, instruct and/or control device 102 to process the report request message from device 140.

In some demonstrative embodiments, controller 124 may be configured to trigger, cause, instruct and/or control device 102 to send the report to device 140, e.g., in response to the report request message.

In some demonstrative embodiments, device 140 may receive the report from device 102, and one or more other reports from one or more other wireless stations located at the same location of device 102 and/or at one or more locations.

In some demonstrative embodiments, controller 154 may be configured to trigger, cause, instruct and/or control device 140 to process a plurality of reports from one or more wireless stations corresponding to a plurality of locations.

In some demonstrative embodiments, a report of the plurality of reports may include an indication of a location and measured radio link information corresponding to the location.

In some demonstrative embodiments, controller 154 may be configured to trigger, cause, instruct and/or control device 140 to update the LB-LS DB 160, for example, based on the plurality of reports.

In some demonstrative embodiments, at least part of the LB-LS DB 160 may be implemented by one or more other elements of system 100. In one example, an entirety of LB-LS DB 160 may be implemented by another element of system 100, for example, another AP or a server, e.g., as described below. In another example, LB-LS DB 160 may be distributed between two or more elements of system 100, e.g., one part of LB-LS DB 160 may be implemented by device 140 and/or another part of LB-LS DB 160 may be implemented by another AP or a server, e.g., as described below.

In some demonstrative embodiments, LB-LS DB 160 may be included as part of, and/or may be implemented by, a server 170.

In some demonstrative embodiments, server 170 may include, operate as, and/or perform one or more functionalities of, a remote server, a web-based server, a cloud server, and/or any other server.

In some demonstrative embodiments, server 170 may include, for example, one or more of a processor 171 and/or a memory unit 175. Server 170 may optionally include other suitable hardware components and/or software components.

In some demonstrative embodiments, processor 171 may include, for example, a CPU, a DSP, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Processor 171 may execute instructions, for example, of an OS of server 171 and/or of one or more suitable applications.

In some demonstrative embodiments, memory unit 175 may include, for example, a RAM, a ROM, a DRAM, a SD-RAM, a flash memory, a volatile memory, a non-volatile memory, a cache memory, a buffer, a short-term memory unit, a long-term memory unit, or other suitable memory units.

In some demonstrative embodiments, server 170 may include at least one controller 174, which may be configured to execute instructions to control one or more functionalities, operations and/or procedures, for example, to manage the LB-LS DB 160, e.g., as described below.

In some demonstrative embodiments, server 170 may include a communication interface 176 to interface between server 170 and devices 102 and/or 140, e.g., via one or more wired and/or wireless communication networks.

In some demonstrative embodiments, communication interface 176 may be implemented using any suitable hardware components and/or software components, for example, processors, controllers, memory units, storage units, input units, output units, communication units, operating systems, and/or applications.

In some demonstrative embodiments, communication interface 176 may include a wireless communication interface and/or a wired communication interface.

In some demonstrative embodiments, communication interface 176 may be associated with and/or may include, for example, a gateway (GW) and/or an application programming interface (API), for example, to communicate information and/or communications between elements of system 100 and/or to one or more other, e.g., internal or external, parties, users, applications and/or systems.

In some demonstrative embodiments, server 170 may be configured, for example, to update LB-LS DB 160, for example, based on a plurality of reports from a plurality of wireless stations and/or a plurality of APs, e.g., as described above.

In some demonstrative embodiments, server 170 may be configured, for example, to provide the radio link information to device 140, for example, to enable device 140 to determine UL link adaption parameters to be provided to a wireless station, for example, device 102, and/or to determine DL link adaption parameters for an AP, for example, device 140, e.g., as described below.

In some demonstrative embodiments, device 102 may send to device 140 the first message including the location information corresponding to the location of device 102, and device 140 may receive the first message from device 102.

In some demonstrative embodiments, controller 154 may be configured to trigger, cause, instruct and/or control device 140 to query server 170, for example, for radio link information corresponding to the location of device 102.

For example, device 140 may send a query message to server 170, e.g., to query for the radio link information. The query message may include, for example, the location information corresponding to the location of device 102.

In some demonstrative embodiments, server 170 may receive the query message from device 140, and may determine the radio link information, e.g., based on LB-LS DB 160, which is implemented by server 170.

In some demonstrative embodiments, server 170 may provide the radio link information to device 140, e.g., in response to the query message.

In some demonstrative embodiments, controller 174 may be configured to trigger, cause, instruct and/or control server 170 to receive the query message from device 140, and to send the radio link information to device 140, e.g., in response to the query message.

In some demonstrative embodiments, device 140 may receive the radio link information from server 170 and may determine the one or more link adaptation parameters of the wireless link between devices 102 and 140, for example, based on the radio link information from server 170

In some demonstrative embodiments, the link adaptation controller may be included as part of, and/or may be implemented by server 170.

In some demonstrative embodiments, server 170 may be configured, for example, to determine the UL link adaption parameters for a wireless station, for example, device 102, and/or to determine DL link adaption parameters for an AP, for example, device 140, e.g., as described below.

In one example, controller 174 may operate as, perform a role of, and/or perform one or more functionalities of, a link adaptation controller.

In some demonstrative embodiments, device 102 may send a first message to server 170, for example, via device 140.

In some demonstrative embodiments, the first message may include the location information corresponding to the location of device 102 and the AP identifier to identify device 140.

In some demonstrative embodiments, controller 124 may be configured to trigger, cause, instruct and/or control device 102 to send the first message to server 170, e.g., via device 140.

In some demonstrative embodiments, controller 154 may be configured to trigger, cause, instruct and/or control device 140 to receive the first message and to forward the first message to server 170.

In some demonstrative embodiments, controller 174 may be configured to trigger, cause, instruct and/or control server 170 to receive from device 102 the first message including the location information corresponding to the location of device 102 and the AP identifier of device 140, e.g., via device 140.

In some demonstrative embodiments, server 170 may to query the LB-LS DB 160, which is implemented by server 170, for radio link information to the location of device 102 and to device 140.

In some demonstrative embodiments, server 170 may determine the one or more link adaptation parameters of the wireless link between devices 102 and 140, for example, based on the radio link information.

In some demonstrative embodiments, controller 174 may be configured to trigger, cause, instruct and/or control server 170 to send the second message to device 102, e.g., via device 140, including the one or more link adaptation parameters of the wireless link between devices 102 and 140.

In some demonstrative embodiments, device 102 may receive the second message from server 170 via device 140, and may establish a wireless communication link between devices 102 and 140, for example, based on the one or more link adaptation parameters in the second message received from server 170, e.g., via device 140.

In some demonstrative embodiments, determining the UL link adaptation parameters, e.g., for device 102, and/or the DL link adaptation parameters, e.g., for device 140, may improve a quality of a wireless link, e.g., an UL/DL wireless link, between devices 102 and 140, and may introduce one or more advantages, e.g., as described below.

In some demonstrative embodiments, implementing one or more features described herein, for example, with respect to an LB-LS procedure to determine one or more link adaptation parameters to be applied to a wireless link, may allow, for example, implementation at an AP level, at a client STA, at a back server, or as a distributed algorithm with a system including the elements described above.

In some demonstrative embodiments, combining location procedures with radio link information, for example, in the form of one or more radio attribute heat maps, e.g., as described above, may allow to achieve good performance, for example, even with little statistics from unicast frame exchange, e.g., for evaluating candidate target APs for re-selection or handover.

In some demonstrative embodiments, implementing one or more features described herein, for example, with respect to an LB-LS procedure to determine one or more link adaptation parameters to be applied to a wireless link, may allow, for example, to estimate a best setting of a Clear Chanel Assessment (CCA), e.g., in accordance with an IEEE 802.11ax Specification, for example, for making efficient use of a medium.

In some demonstrative embodiments, implementing one or more features described herein, for example, with respect to an LB-LS procedure to determine one or more link adaptation parameters to be applied to a wireless link, may allow, for example, spatial reuse optimization, and thus, for example, spectral efficiency, for example, by identifying which STAs are likely to have the best spatial separation.

In some demonstrative embodiments, implementing one or more features described herein, for example, with respect to an LB-LS procedure to determine one or more link adaptation parameters to be applied to a wireless link, may allow, for example, to avoid cases such as, for example, spiral death, e.g., where co-existence interference may cause MCS scale-down, which may increase interference level. For example, by using LB-LS information, e.g., as described above, these cases may be identified and avoided or mitigated.

In some demonstrative embodiments, implementing one or more features described herein, for example, with respect to an LB-LS procedure to determine one or more link adaptation parameters to be applied to a wireless link, may allow, for example, good performance, for example, in a network where most radio activity is with highly directional links, e.g., by directional antennas, beam steering, and/or antenna pattern, e.g. caused by a Smartphone large touch display; and/or may enable subsiding/removing such an effect from the measured link conditions. For example, the heat map may represent a normalized medium attribute.

In some demonstrative embodiments, implementing one or more features described herein, for example, with respect to an LB-LS procedure to determine one or more link adaptation parameters to be applied to a wireless link, may provide, for example, a good prediction to an expected link budget in the near future according to the locality principal.

In some demonstrative embodiments, implementing one or more features described herein, for example, with respect to an LB-LS procedure to determine one or more link adaptation parameters to be applied to a wireless link, may enable, for example, non-causal medium attribute estimation, for example, if a trajectory is identified, e.g., using multiple fixes or combined with other positioning techniques, such as, angular azimuth detection.

In some demonstrative embodiments, implementing one or more features described herein, for example, with respect to an LB-LS procedure to determine one or more link adaptation parameters to be applied to a wireless link, may perform well, for example, in both high and low traffic interaction, e.g., as compared with CINR, RSSI, which may work better as statistics increases.

In some demonstrative embodiments, implementing one or more features described herein, for example, with respect to an LB-LS procedure to determine one or more link adaptation parameters to be applied to a wireless link, may allow operation in both the associated and unassociated modes, e.g., as FTM and/or other positioning techniques may be supported in both associated and unassociated modes.

In some demonstrative embodiments, implementing one or more features described herein, for example, with respect to an LB-LS procedure to determine one or more link adaptation parameters to be applied to a wireless link, may complement, for example, the locality information of other unicast attributes such as, for example, device measured CINR with CINR heat-map and location reporting, for example, where the measured CINR provides most local information, and location provides a 2nd degree, e.g., few meters expected CINR conditions.

In some demonstrative embodiments, implementing one or more features described herein, for example, with respect to an LB-LS procedure to determine one or more link adaptation parameters to be applied to a wireless link, may enable, for example, real-time identification and/or countermeasure of link issues, e.g. local peak CINR due versus absolute peak CINR, e.g., caused by mall-formed beam forming.

In some demonstrative embodiments, implementing one or more features described herein, for example, with respect to an LB-LS procedure to determine one or more link adaptation parameters to be applied to a wireless link, may allow, for example, gathering and/or generating medium attributes heat by a local AP or a back server.

Figure 2:
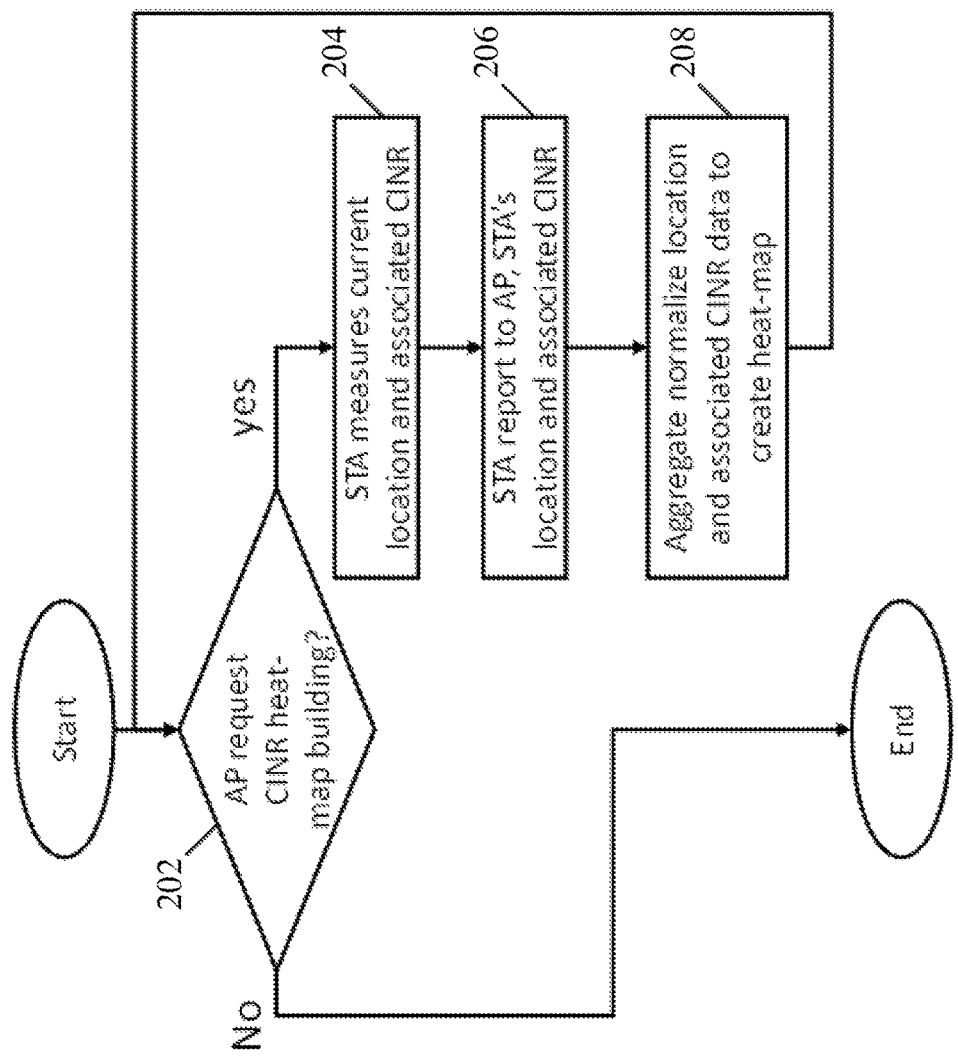
FIG. 2 is a schematic flow-chart illustration of a method of generating a Carrier to Interference Noise Ratio (CINR) heat map, in accordance with some demonstrative embodiments.

Reference is made to FIG. 2, which schematically illustrates a method of generating a CINR heat map, in accordance with some demonstrative embodiments. For example, one or more of the operations of the method of FIG. 2 may be performed by one or more elements of a system, system 100 (FIG. 1); a device, e.g., wireless communication devices 102 and/or 140 (FIG. 1); a server, e.g., server 170 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

In some demonstrative embodiments, the CINR heat map may be implemented as part of the LB-LS DB 160 (FIG. 1). In other embodiments, the radio link information heat map may be generated using a simulation configured to create a heat map.

In some demonstrative embodiments, one or more of the operations of FIG. 2 may be preformed with respect to a CINR heat map. In other embodiments, one or more operations of FIG. 2 may be implemented with respect to generating any other radio link information, e.g., an RSSI heat map, an SNR heat map, and/or the like.

As indicated at block 202, the method may include sending a report request message to a wireless station. For example, device 140 (FIG. 1) may send the report request message to device 102 (FIG. 1), e.g., as described above.

As indicated at block 204, the method may include measuring a location of the wireless station and a CINR at the location. For example, device 102 (FIG. 1) may measure the location of device 102 (FIG. 1) and the CINR at the location, e.g., as described above.

As indicated at block 206, the method may include reporting the location of the wireless station and the CINR at the location. For example, device 102 (FIG. 1) may send to device 102 (FIG. 1) the report including the location of device 102 (FIG. 1) and the radio link information including the CINR at the location, e.g., as described above.

As indicated at block 208, the method may include aggregating locations and CINRs at the locations to create the CINR heat map. For example, device 140 (FIG. 1) may receive a plurality of reports, and may update LB-LS DB 160 (FIG. 1), for example, based on the reports, e.g., as described above.

Figure 3:
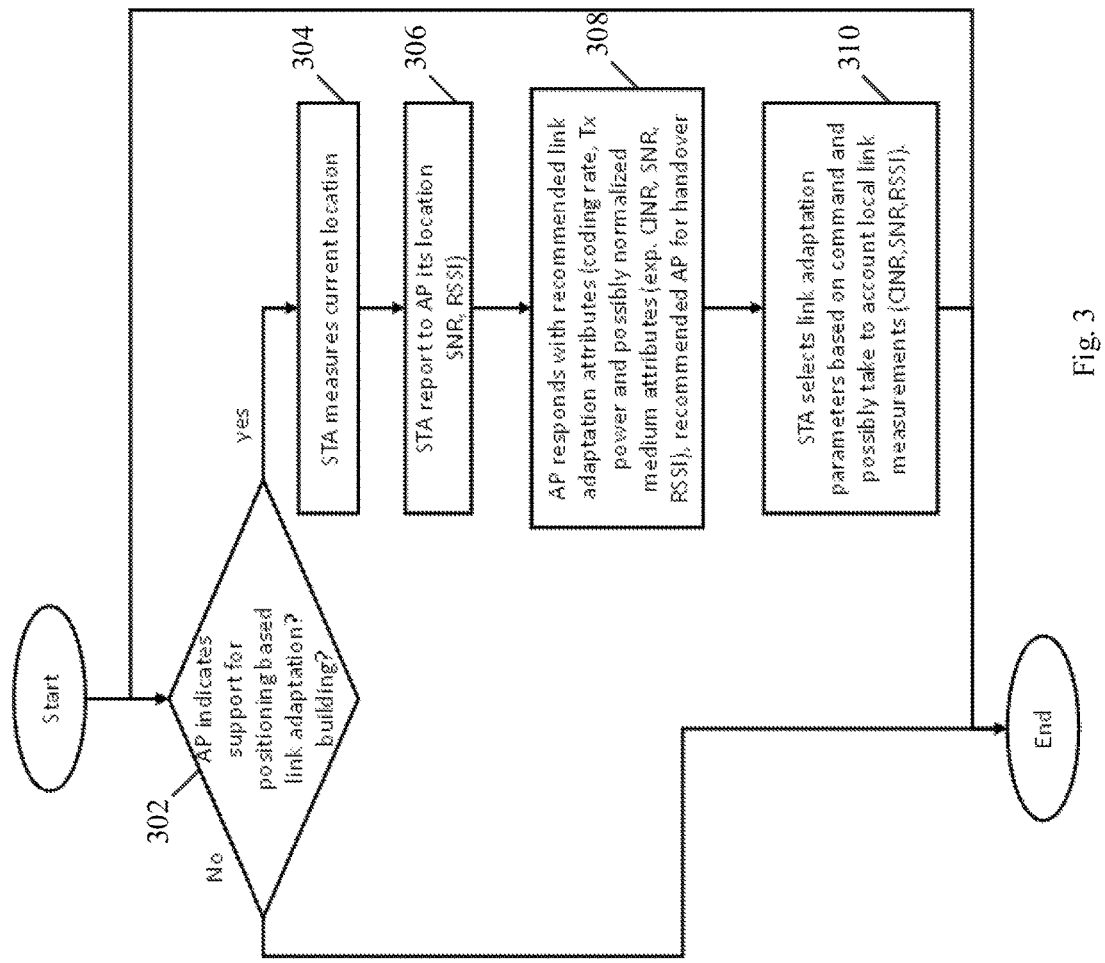
FIG. 3 is a schematic flow-chart illustration of a method of determining one or more link adaptation parameters, in accordance with some demonstrative embodiments.

Reference is made to FIG. 3, which schematically illustrates a method of determining one or more link adaptation parameters, in accordance with some demonstrative embodiments. For example, one or more of the operations of the method of FIG. 3 may be performed by one or more elements of a system, system 100 (FIG. 1); a device, e.g., wireless communication devices 102 and/or 140 (FIG. 1); a server, e.g., server 170 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

In some demonstrative embodiments, one or more operations of the method of FIG. 3 may be performed by an AP, e.g., an AP implemented by device 140 (FIG. 1). In other embodiments, one or more operations of the method of FIG. 3 may be performed by a server, e.g., server 170 (FIG. 1).

As indicated at block 302, the method may include indicating a capability to provide link adaptation parameters based on a location of a wireless station. For example, device 140 (FIG. 1) may indicate its capability to determine the one or more link adaptation parameters, for example, based on the location of device 102 (FIG. 1), e.g., as described above.

As indicated at block 304, the method may include measuring a location of the wireless station. For example, device 102 (FIG. 1) may measure the location of device 102 (FIG. 1), e.g., as described above.

As indicated at block 306, the method may include reporting the location of the wireless station and radio link information, e.g., CINR, RSSI, and/or SNR information, at the location. For example, device 102 (FIG. 1) may send the first message including the location of device 102 (FIG. 1) and the radio link information, for example, to device 140 (FIG. 1) and/or server 170 (FIG. 1), e.g., as described above.

As indicated at block 310, the method may include determining at the AP link adaptation parameters and/or an AP for handover. For example, device 140 (FIG. 1) may determine the link adaptation parameters of the wireless link between devices 102 and 140 (FIG. 1), for example, based on radio link information corresponding to the location of device 102 (FIG. 1), e.g., as described above.

As indicated at block 310, the method may include determining at the wireless station link adaptation parameters, for example, based on the link adaptation parameters from the AP and/or local radio link measurements performed by the wireless station. For example, device 102 (FIG. 1) may establish the wireless link between devices 102 and 140 (FIG. 1), for example, based on the one or more link adaptation parameters from device 140 (FIG. 1) and/or server 170 (FIG. 1), e.g., as described above.

Figure 4:
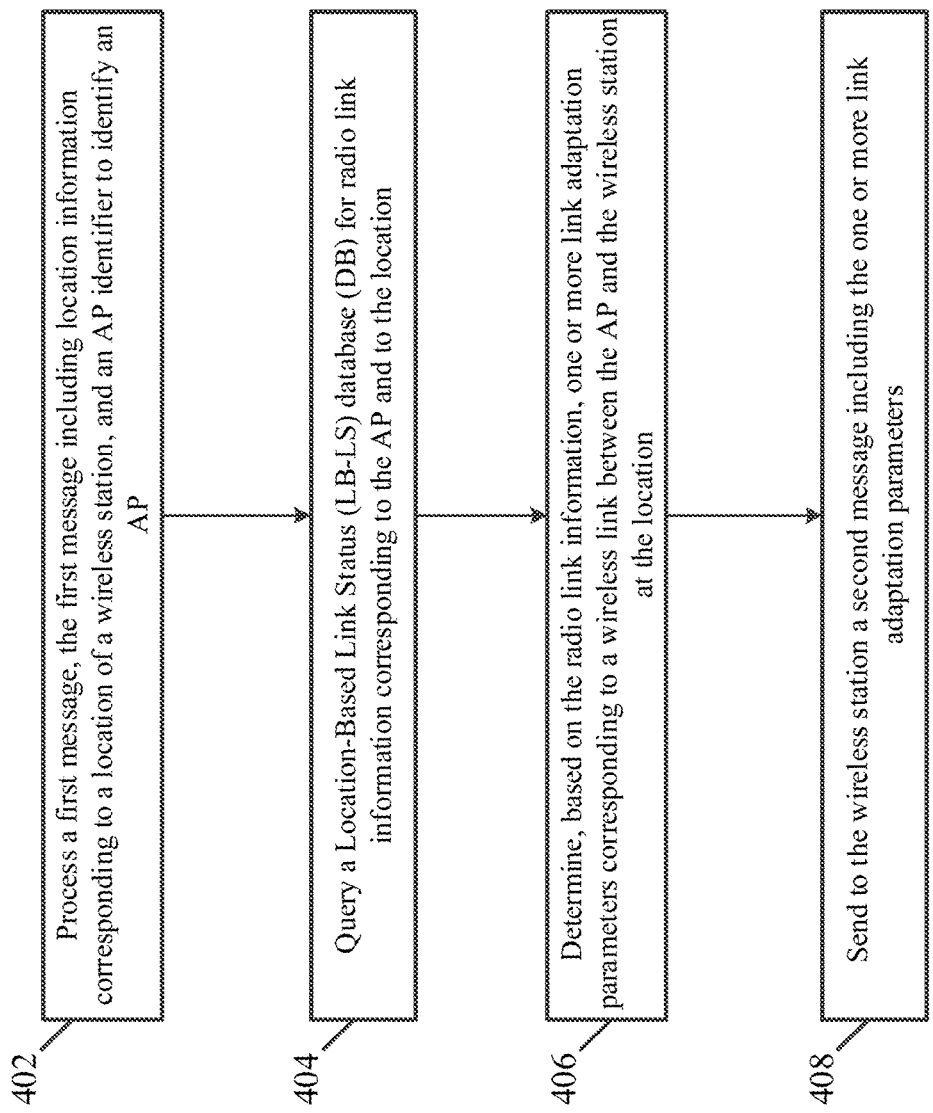
FIG. 4 is a schematic flow-chart illustration of a method of determining one or more link adaptation parameters, in accordance with some demonstrative embodiments.

Reference is made to FIG. 4, which schematically illustrates a method of determining one or more link adaption parameters, in accordance with some demonstrative embodiments. For example, one or more of the operations of the method of FIG. 4 may be performed by one or more elements of a system, system 100 (FIG. 1); a device, e.g., wireless communication devices 102 and/or 140 (FIG. 1); a server, e.g., server 170 (FIG. 1); a controller, e.g., controller 124 (FIG. 1), controller 174 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 402, the method may include processing a first message from a wireless station, the first message including location information corresponding to a location of the wireless station, and an AP identifier to identify an AP. For example, device 140 (FIG. 1) may process the first message from device 102 (FIG. 1), the first message including the location information and the AP identifier to identify an AP implemented by device 140 (FIG. 1) or a neighbor AP, e.g., as described above.

As indicated at block 404, the method may include querying a LB-LS DB for radio link information corresponding to the AP and to the location. For example, device 140 (FIG. 1) may query LB-LS DB 160 (FIG. 1) for the radio link information corresponding to the AP and to the location identified by device 102 (FIG. 1), e.g., as described above.

As indicated at block 406, the method may include determining, based on the radio link information, one or more link adaptation parameters corresponding to a wireless link between the AP and the wireless station at the location. For example, device 140 (FIG. 1) may determine the one or more link adaptation parameters corresponding to the wireless link between device 140 (FIG. 1) and device 102 (FIG. 1), for example, based on the radio link information, e.g., as described above.

As indicated at block 408, the method may include sending to the wireless station a second message including the one or more link adaptation parameters. For example, device 140 (FIG. 1) may send to device 102 (FIG. 1) the second message including the one or more link adaptation parameters, e.g., as described above.

Figure 5:
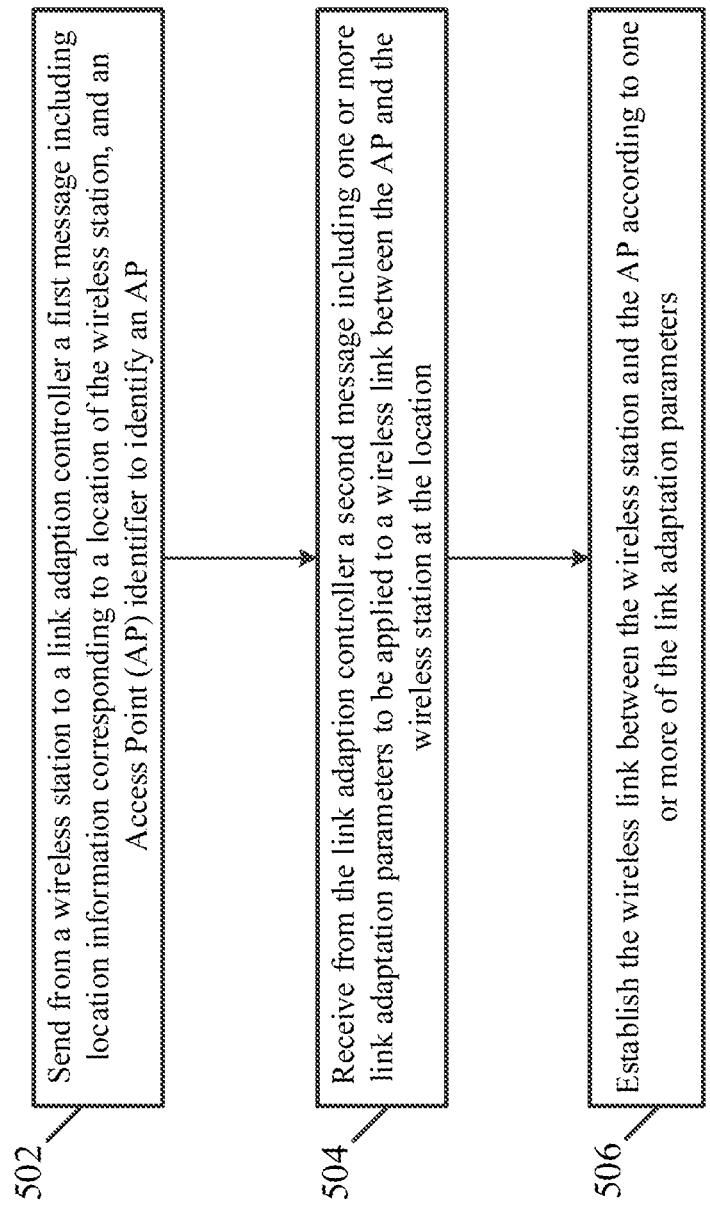
FIG. 5 is a schematic flow-chart illustration of a method of establishing a wireless link according to one or more link adaptation parameters, in accordance with some demonstrative embodiments.

Reference is made to FIG. 5, which schematically illustrates a method of establishing a wireless link according to one or more link adaption parameters, in accordance with some demonstrative embodiments. For example, one or more of the operations of the method of FIG. 5 may be performed by one or more elements of a system, system 100 (FIG. 1); a device, e.g., wireless communication devices 102 and/or 140 (FIG. 1); a server, e.g., server 170 (FIG. 1); a controller, e.g., controller 124 (FIG. 1), controller 174 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 502, the method may include sending from a wireless station to a link adaption controller a first message including location information corresponding to a location of the wireless station, and an AP identifier to identify an AP. For example, device 102 (FIG. 1) may send to device 140 (FIG. 1) a first message including location information corresponding to the location of device 102 (FIG. 1) and an AP identifier to identify device 140 (FIG. 1), e.g., as described above.

As indicated at block 504, the method may include receiving from the link adaption controller a second message including one or more link adaptation parameters to be applied to a wireless link between the AP and the wireless station at the location. For example, device 102 (FIG. 1) may receive from device 140 (FIG. 1) the second message including the one or more link adaptation parameters to be applied to the wireless link between device 102 (FIG. 1) and device 140 (FIG. 1) at the location of device 102 (FIG. 1), e.g., as described above.

As indicated at block 506, the method may include establishing the wireless link between the wireless station and the AP according to the one or more link adaptation parameters. For example, device 102 (FIG. 1) may establish the wireless link with device 140 (FIG. 1) according to the one or more link adaptation parameters, e.g., as described above.

Figure 6:
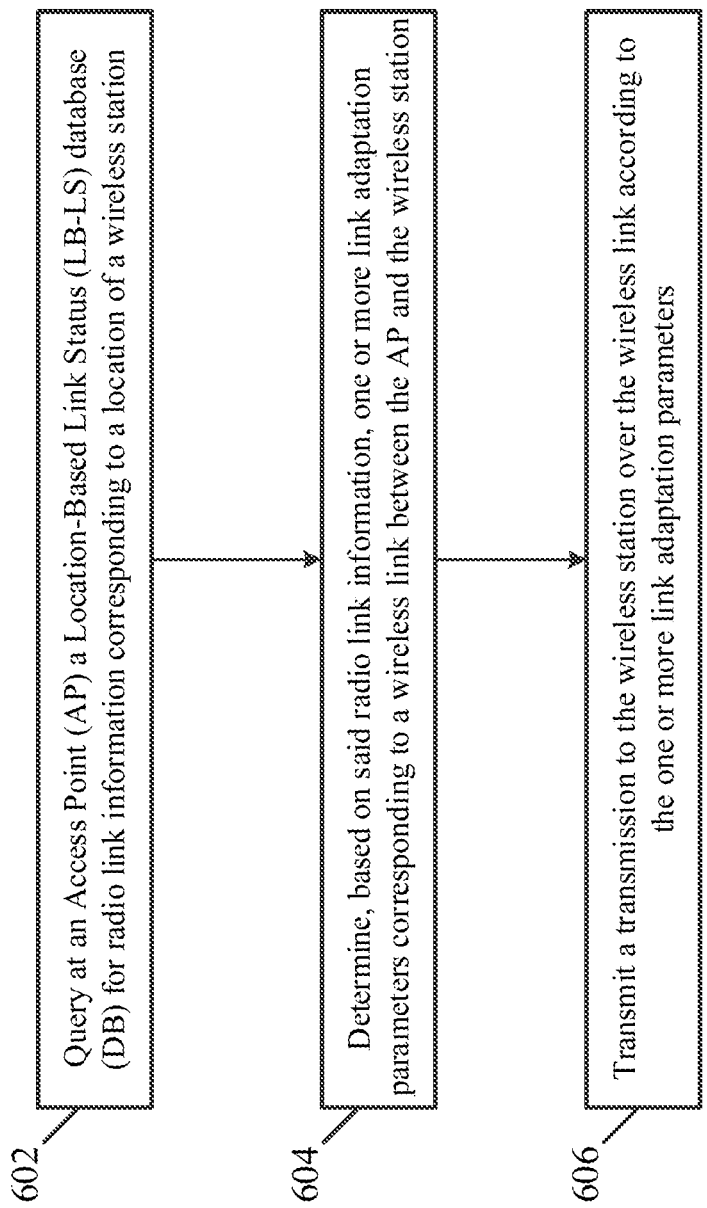
FIG. 6 is a schematic flow-chart illustration of a method of determining one or more link adaptation parameters, in accordance with some demonstrative embodiments.

Reference is made to FIG. 6, which schematically illustrates a method of determining one or more link adaption parameters, in accordance with some demonstrative embodiments. For example, one or more of the operations of the method of FIG. 6 may be performed by one or more elements of a system, system 100 (FIG. 1); a device, e.g., wireless communication devices 102 and/or 140 (FIG. 1); a server, e.g., server 170 (FIG. 1); a controller, e.g., controller 124 (FIG. 1), controller 174 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 602, the method may include querying at an AP a LB-DB for radio link information corresponding to a location of a wireless station. For example, device 140 (FIG. 1) may query LB-LS DB 160 (FIG. 1) for the radio link information corresponding to the location of device 102 (FIG. 1), e.g., as described above.

As indicated at block 604, the method may include determining, based on the radio link information, one or more link adaptation parameters corresponding to a wireless link between the AP and the wireless station. For example, device 140 (FIG. 1) may determine the one or more link adaptation parameters corresponding to the wireless link between device 140 (FIG. 1) and device 102 (FIG. 1), e.g., as described above.

As indicated at block 606, the method may include transmitting a transmission to the wireless station over the wireless link according to the one or more link adaptation parameters. For example, device 140 (FIG. 1) may transmit the transmission to device 102 (FIG. 1) over the wireless link according to the one or more of the link adaptation parameters, e.g., as described above.

Figure 7:
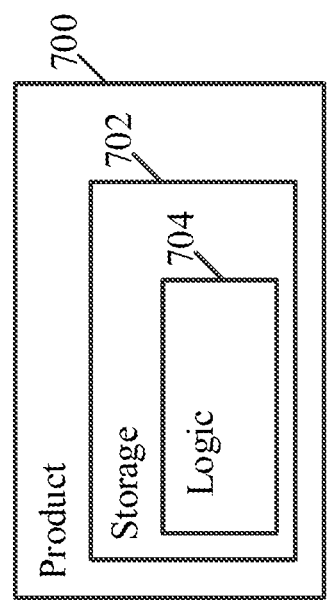
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124, 154 and/or 174 (FIG. 1), message processors 128 and/or 158 (FIG. 1), server 170 (FIG. 1), and/or to perform one or more operations described above with respect to FIGS. 1, 2, 3, 4, 5, and /or 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to process a first message from a wireless station, the first message comprising location information corresponding to a location of the wireless station, and an Access Point (AP) identifier to identify an AP; query a Location-Based Link Status (LB-LS) database (DB) for radio link information corresponding to the AP and to the location; determine, based on the radio link information, one or more link adaptation parameters corresponding to a wireless link between the AP and the wireless station at the location; and send to the wireless station a second message comprising the one or more link adaptation parameters.

Example 2 includes the subject matter of Example 1, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 3 includes the subject matter of Example 1 or 2, and optionally, wherein the one or more link adaptation parameters comprise a modulation and coding scheme (MCS) for the wireless link.

Example 4 includes the subject matter of any one of Examples 1-3, and optionally, wherein the one or more link adaptation parameters comprise one or more Clear Channel Assessment (CCA) parameters to communicate over the wireless link.

Example 5 includes the subject matter of any one of Examples 1-4, and optionally, wherein the one or more link adaptation parameters comprise a steering matrix or a Multi User (MU) steering matrix.

Example 6 includes the subject matter of any one of Examples 1-5, and optionally, wherein the one or more link adaptation parameters comprise scheduling information to schedule communications over the wireless link.

Example 7 includes the subject matter of any one of Examples 1-6, and optionally, wherein the one or more link adaptation parameters comprise a transmit (Tx) power to transmit over the wireless link.

Example 8 includes the subject matter of any one of Examples 1-7, and optionally, wherein the one or more link adaptation parameters comprise a Number of Spatial Streams (NSS) to communicate over the wireless link.

Example 9 includes the subject matter of any one of Examples 1-8, and optionally, comprising the LB-LS DB.

Example 10 includes the subject matter of Example 9, and optionally, wherein the apparatus is configured to process a plurality of reports from one or more wireless stations corresponding to a plurality of locations, and to update the LB-LS DB based on the reports, the plurality of reports corresponding to a plurality of locations, a report of the plurality of reports comprising an indication of a location and measured radio link information corresponding to the location.

Example 11 includes the subject matter of any one of Examples 1-10, and optionally, wherein the link adaptation parameters comprise link adaptation parameters of a neighbor AP for handover of the wireless station.

Example 12 includes the subject matter of any one of Examples 1-11, and optionally, wherein the apparatus is configured to query a server for the radio link information.

Example 13 includes the subject matter of any one of Examples 1-12, and optionally, comprising the AP.

Example 14 includes the subject matter of any one of Examples 1-12, and optionally, wherein the apparatus is configured to receive the first message from the station via the AP, and to send the second message to the wireless station via the AP.

Example 15 includes the subject matter of any one of Examples 1-14, and optionally, comprising one or more antennas, a memory and a processor.

Example 16 includes an system of wireless communication comprising an apparatus, the apparatus comprising one or more antennas; a memory; a processor; and a controller configured to cause the apparatus to process a first message from a wireless station, the first message comprising location information corresponding to a location of the wireless station, and an Access Point (AP) identifier to identify an AP; query a Location-Based Link Status (LB-LS) database (DB) for radio link information corresponding to the AP and to the location; determine, based on the radio link information, one or more link adaptation parameters corresponding to a wireless link between the AP and the wireless station at the location; and send to the wireless station a second message comprising the one or more link adaptation parameters.

Example 17 includes the subject matter of Example 16, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 18 includes the subject matter of Example 16 or 17, and optionally, wherein the one or more link adaptation parameters comprise a modulation and coding scheme (MCS) for the wireless link.

Example 19 includes the subject matter of any one of Examples 16-18, and optionally, wherein the one or more link adaptation parameters comprise one or more Clear Channel Assessment (CCA) parameters to communicate over the wireless link.

Example 20 includes the subject matter of any one of Examples 16-19, and optionally, wherein the one or more link adaptation parameters comprise a steering matrix or a Multi User (MU) steering matrix.

Example 21 includes the subject matter of any one of Examples 16-20, and optionally, wherein the one or more link adaptation parameters comprise scheduling information to schedule communications over the wireless link.

Example 22 includes the subject matter of any one of Examples 16-21, and optionally, wherein the one or more link adaptation parameters comprise a transmit (Tx) power to transmit over the wireless link.

Example 23 includes the subject matter of any one of Examples 16-22, and optionally, wherein the one or more link adaptation parameters comprise a Number of Spatial Streams (NSS) to communicate over the wireless link.

Example 24 includes the subject matter of any one of Examples 16-23, and optionally, wherein the apparatus comprises the LB-LS DB.

Example 25 includes the subject matter of Example 24, and optionally, wherein the apparatus is configured to process a plurality of reports from one or more wireless stations corresponding to a plurality of locations, and to update the LB-LS DB based on the reports, the plurality of reports corresponding to a plurality of locations, a report of the plurality of reports comprising an indication of a location and measured radio link information corresponding to the location.

Example 26 includes the subject matter of any one of Examples 16-25, and optionally, wherein the link adaptation parameters comprise link adaptation parameters of a neighbor AP for handover of the wireless station.

Example 27 includes the subject matter of any one of Examples 16-26, and optionally, wherein the apparatus is configured to query a server for the radio link information.

Example 28 includes the subject matter of any one of Examples 16-27, and optionally, wherein the apparatus comprises the AP.

Example 29 includes the subject matter of any one of Examples 16-27, and optionally, wherein the apparatus is configured to receive the first message from the station via the AP, and to send the second message to the wireless station via the AP.

Example 30 includes a method comprising processing a first message from a wireless station, the first message comprising location information corresponding to a location of the wireless station, and an Access Point (AP) identifier to identify an AP; querying a Location-Based Link Status (LB-LS) database (DB) for radio link information corresponding to the AP and to the location; determining, based on the radio link information, one or more link adaptation parameters corresponding to a wireless link between the AP and the wireless station at the location; and sending to the wireless station a second message comprising the one or more link adaptation parameters.

Example 31 includes the subject matter of Example 30, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 32 includes the subject matter of Example 30 or 31, and optionally, wherein the one or more link adaptation parameters comprise a modulation and coding scheme (MCS) for the wireless link.

Example 33 includes the subject matter of any one of Examples 30-32, and optionally, wherein the one or more link adaptation parameters comprise one or more Clear Channel Assessment (CCA) parameters to communicate over the wireless link.

Example 34 includes the subject matter of any one of Examples 30-33, and optionally, wherein the one or more link adaptation parameters comprise a steering matrix or a Multi User (MU) steering matrix.

Example 35 includes the subject matter of any one of Examples 30-34, and optionally, wherein the one or more link adaptation parameters comprise scheduling information to schedule communications over the wireless link.

Example 36 includes the subject matter of any one of Examples 30-35, and optionally, wherein the one or more link adaptation parameters comprise a transmit (Tx) power to transmit over the wireless link.

Example 37 includes the subject matter of any one of Examples 30-36, and optionally, wherein the one or more link adaptation parameters comprise a Number of Spatial Streams (NSS) to communicate over the wireless link.

Example 38 includes the subject matter of any one of Examples 30-37, and optionally, comprising processing a plurality of reports from one or more wireless stations corresponding to a plurality of locations, and updating the LB-LS DB based on the reports, the plurality of reports corresponding to a plurality of locations, a report of the plurality of reports comprising an indication of a location and measured radio link information corresponding to the location.

Example 39 includes the subject matter of any one of Examples 30-38, and optionally, wherein the link adaptation parameters comprise link adaptation parameters of a neighbor AP for handover of the wireless station.

Example 40 includes the subject matter of any one of Examples 30-39, and optionally, comprising querying a server for the radio link information.

Example 41 includes the subject matter of any one of Examples 30-40, and optionally, comprising receiving the first message from the station via the AP, and sending the second message to the wireless station via the AP.

Example 42 includes a product comprising one or more tangible computer-readable non-transitory storage media comprising computer-executable instructions operable to, when executed by at least one computer processor, enable the at least one computer processor to implement operations comprising processing a first message from a wireless station, the first message comprising location information corresponding to a location of the wireless station, and an Access Point (AP) identifier to identify an AP; querying a Location-Based Link Status (LB-LS) database (DB) for radio link information corresponding to the AP and to the location; determining, based on the radio link information, one or more link adaptation parameters corresponding to a wireless link between the AP and the wireless station at the location; and sending to the wireless station a second message comprising the one or more link adaptation parameters.

Example 43 includes the subject matter of Example 42, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 44 includes the subject matter of Example 42 or 43, and optionally, wherein the one or more link adaptation parameters comprise a modulation and coding scheme (MCS) for the wireless link.

Example 45 includes the subject matter of any one of Examples 42-44, and optionally, wherein the one or more link adaptation parameters comprise one or more Clear Channel Assessment (CCA) parameters to communicate over the wireless link.

Example 46 includes the subject matter of any one of Examples 42-45, and optionally, wherein the one or more link adaptation parameters comprise a steering matrix or a Multi User (MU) steering matrix.

Example 47 includes the subject matter of any one of Examples 42-46, and optionally, wherein the one or more link adaptation parameters comprise scheduling information to schedule communications over the wireless link.

Example 48 includes the subject matter of any one of Examples 42-47, and optionally, wherein the one or more link adaptation parameters comprise a transmit (Tx) power to transmit over the wireless link.

Example 49 includes the subject matter of any one of Examples 42-48, and optionally, wherein the one or more link adaptation parameters comprise a Number of Spatial Streams (NSS) to communicate over the wireless link.

Example 50 includes the subject matter of any one of Examples 42-49, and optionally, wherein the operations comprise processing a plurality of reports from one or more wireless stations corresponding to a plurality of locations, and updating the LB-LS DB based on the reports, the plurality of reports corresponding to a plurality of locations, a report of the plurality of reports comprising an indication of a location and measured radio link information corresponding to the location.

Example 51 includes the subject matter of any one of Examples 42-50, and optionally, wherein the link adaptation parameters comprise link adaptation parameters of a neighbor AP for handover of the wireless station.

Example 52 includes the subject matter of any one of Examples 42-51, and optionally, wherein the operations comprise querying a server for the radio link information.

Example 53 includes the subject matter of any one of Examples 42-52, and optionally, wherein the operations comprise receiving the first message from the station via the AP, and sending the second message to the wireless station via the AP.

Example 54 includes an apparatus of wireless communication comprising means for processing a first message from a wireless station, the first message comprising location information corresponding to a location of the wireless station, and an Access Point (AP) identifier to identify an AP; means for querying a Location-Based Link Status (LB-LS) database (DB) for radio link information corresponding to the AP and to the location; means for determining, based on the radio link information, one or more link adaptation parameters corresponding to a wireless link between the AP and the wireless station at the location; and means for sending to the wireless station a second message comprising the one or more link adaptation parameters.

Example 55 includes the subject matter of Example 54, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 56 includes the subject matter of Example 54 or 55, and optionally, wherein the one or more link adaptation parameters comprise a modulation and coding scheme (MCS) for the wireless link.

Example 57 includes the subject matter of any one of Examples 54-56, and optionally, wherein the one or more link adaptation parameters comprise one or more Clear Channel Assessment (CCA) parameters to communicate over the wireless link.

Example 58 includes the subject matter of any one of Examples 54-57, and optionally, wherein the one or more link adaptation parameters comprise a steering matrix or a Multi User (MU) steering matrix.

Example 59 includes the subject matter of any one of Examples 54-58, and optionally, wherein the one or more link adaptation parameters comprise scheduling information to schedule communications over the wireless link.

Example 60 includes the subject matter of any one of Examples 54-59, and optionally, wherein the one or more link adaptation parameters comprise a transmit (Tx) power to transmit over the wireless link.

Example 61 includes the subject matter of any one of Examples 54-60, and optionally, wherein the one or more link adaptation parameters comprise a Number of Spatial Streams (NSS) to communicate over the wireless link.

Example 62 includes the subject matter of any one of Examples 54-61, and optionally, comprising means for processing a plurality of reports from one or more wireless stations corresponding to a plurality of locations, and updating the LB-LS DB based on the reports, the plurality of reports corresponding to a plurality of locations, a report of the plurality of reports comprising an indication of a location and measured radio link information corresponding to the location.

Example 63 includes the subject matter of any one of Examples 54-62, and optionally, wherein the link adaptation parameters comprise link adaptation parameters of a neighbor AP for handover of the wireless station.

Example 64 includes the subject matter of any one of Examples 54-63, and optionally, comprising means for querying a server for the radio link information.

Example 65 includes the subject matter of any one of Examples 54-64, and optionally, comprising means for receiving the first message from the station via the AP, and sending the second message to the wireless station via the AP.

Example 66 includes an apparatus comprising circuitry and logic configured to cause a wireless station to send to a link adaption controller a first message comprising location information corresponding to a location of the wireless station, and an Access Point (AP) identifier to identify an AP; receive from the link adaption controller a second message comprising one or more link adaptation parameters to be applied to a wireless link between the AP and the wireless station at the location; and establish the wireless link between the AP and the wireless station according to the one or more link adaptation parameters.

Example 67 includes the subject matter of Example 66, and optionally, wherein the one or more link adaptation parameters comprise a modulation and coding scheme (MCS) for the wireless link.

Example 68 includes the subject matter of Example 66 or 67, and optionally, wherein the one or more link adaptation parameters comprise one or more Clear Channel Assessment (CCA) parameters to communicate over the wireless link.

Example 69 includes the subject matter of any one of Examples 66-68, and optionally, wherein the one or more link adaptation parameters comprise a steering matrix or a Multi User (MU) steering matrix.

Example 70 includes the subject matter of any one of Examples 66-69, and optionally, wherein the one or more link adaptation parameters comprise scheduling information to schedule communications over the wireless link.

Example 71 includes the subject matter of any one of Examples 66-70, and optionally, wherein the one or more link adaptation parameters comprise a transmit (Tx) power to transmit over the wireless link.

Example 72 includes the subject matter of any one of Examples 66-71, and optionally, wherein the one or more link adaptation parameters comprise a Number of Spatial Streams (NSS) to communicate over the wireless link.

Example 73 includes the subject matter of any one of Examples 66-72, and optionally, wherein the apparatus is configured to cause the wireless station to send a report to the link adaptation controller, the report comprising an indication of the location and measured radio link information corresponding to the location.

Example 74 includes the subject matter of Example 73, and optionally, wherein the measured radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 75 includes the subject matter of Example 73 or 74, and optionally, wherein the apparatus is configured to cause the wireless station to process a report request message from the link adaptation controller, and to send the report in response to the report request message.

Example 76 includes the subject matter of any one of Examples 66-75, and optionally, wherein the apparatus is configured to cause the wireless station to perform a location measurement to estimate the location of the wireless station.

Example 77 includes the subject matter of Example 76, and optionally, wherein the location measurement comprises a Fine Timing Measurement (FTM).

Example 78 includes the subject matter of any one of Examples 66-77, and optionally, wherein the AP comprises the link adaptation controller.

Example 79 includes the subject matter of any one of Examples 66-77, and optionally, wherein the apparatus is configured to cause the wireless station to send the first message to a first AP comprising the link adaptation controller, the first message comprising an AP identifier of a second AP.

Example 80 includes the subject matter of any one of Examples 66-79, and optionally, wherein the apparatus is configured to cause the wireless station to send the first message to a server comprising the link adaptation controller.

Example 81 includes the subject matter of any one of Examples 66-80, and optionally, comprising one or more antennas, a memory and a processor.

Example 82 includes a system of wireless communication comprising a wireless station, the wireless station comprising one or more antennas; a memory; a processor; and a controller configured to cause the wireless station to send to a link adaption controller a first message comprising location information corresponding to a location of the wireless station, and an Access Point (AP) identifier to identify an AP; receive from the link adaption controller a second message comprising one or more link adaptation parameters to be applied to a wireless link between the AP and the wireless station at the location; and establish the wireless link between the AP and the wireless station according to the one or more link adaptation parameters.

Example 83 includes the subject matter of Example 82, and optionally, wherein the one or more link adaptation parameters comprise a modulation and coding scheme (MCS) for the wireless link.

Example 84 includes the subject matter of Example 82 or 83, and optionally, wherein the one or more link adaptation parameters comprise one or more Clear Channel Assessment (CCA) parameters to communicate over the wireless link.

Example 85 includes the subject matter of any one of Examples 82-84, and optionally, wherein the one or more link adaptation parameters comprise a steering matrix or a Multi User (MU) steering matrix.

Example 86 includes the subject matter of any one of Examples 82-85, and optionally, wherein the one or more link adaptation parameters comprise scheduling information to schedule communications over the wireless link.

Example 87 includes the subject matter of any one of Examples 82-86, and optionally, wherein the one or more link adaptation parameters comprise a transmit (Tx) power to transmit over the wireless link.

Example 88 includes the subject matter of any one of Examples 82-87, and optionally, wherein the one or more link adaptation parameters comprise a Number of Spatial Streams (NSS) to communicate over the wireless link.

Example 89 includes the subject matter of any one of Examples 82-88, and optionally, wherein the controller is configured to cause the wireless station to send a report to the link adaptation controller, the report comprising an indication of the location and measured radio link information corresponding to the location.

Example 90 includes the subject matter of Example 89, and optionally, wherein the measured radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 91 includes the subject matter of Example 89 or 90, and optionally, wherein the controller is configured to cause the wireless station to process a report request message from the link adaptation controller, and to send the report in response to the report request message.

Example 92 includes the subject matter of any one of Examples 82-91, and optionally, wherein the controller is configured to cause the wireless station to perform a location measurement to estimate the location of the wireless station.

Example 93 includes the subject matter of Example 92, and optionally, wherein the location measurement comprises a Fine Timing Measurement (FTM).

Example 94 includes the subject matter of any one of Examples 82-93, and optionally, wherein the AP comprises the link adaptation controller.

Example 95 includes the subject matter of any one of Examples 82-93, and optionally, wherein the controller is configured to cause the wireless station to send the first message to a first AP comprising the link adaptation controller, the first message comprising an AP identifier of a second AP.

Example 96 includes the subject matter of any one of Examples 82-95, and optionally, wherein the controller is configured to cause the wireless station to send the first message to a server comprising the link adaptation controller.

Example 97 includes a method to be performed by a wireless station, the method comprising sending to a link adaption controller a first message comprising location information corresponding to a location of the wireless station, and an Access Point (AP) identifier to identify an AP; receiving from the link adaption controller a second message comprising one or more link adaptation parameters to be applied to a wireless link between the AP and the wireless station at the location; and establishing the wireless link between the AP and the wireless station according to the one or more link adaptation parameters.

Example 98 includes the subject matter of Example 97, and optionally, wherein the one or more link adaptation parameters comprise a modulation and coding scheme (MCS) for the wireless link.

Example 99 includes the subject matter of Example 97 or 98, and optionally, wherein the one or more link adaptation parameters comprise one or more Clear Channel Assessment (CCA) parameters to communicate over the wireless link.

Example 100 includes the subject matter of any one of Examples 97-99, and optionally, wherein the one or more link adaptation parameters comprise a steering matrix or a Multi User (MU) steering matrix.

Example 101 includes the subject matter of any one of Examples 97-100, and optionally, wherein the one or more link adaptation parameters comprise scheduling information to schedule communications over the wireless link.

Example 102 includes the subject matter of any one of Examples 97-101, and optionally, wherein the one or more link adaptation parameters comprise a transmit (Tx) power to transmit over the wireless link.

Example 103 includes the subject matter of any one of Examples 97-102, and optionally, wherein the one or more link adaptation parameters comprise a Number of Spatial Streams (NSS) to communicate over the wireless link.

Example 104 includes the subject matter of any one of Examples 97-103, and optionally, comprising sending a report to the link adaptation controller, the report comprising an indication of the location and measured radio link information corresponding to the location.

Example 105 includes the subject matter of Example 104, and optionally, wherein the measured radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 106 includes the subject matter of Example 104 or 105, and optionally, comprising processing a report request message from the link adaptation controller, and sending the report in response to the report request message.

Example 107 includes the subject matter of any one of Examples 97-106, and optionally, comprising performing a location measurement to estimate the location of the wireless station.

Example 108 includes the subject matter of Example 107, and optionally, wherein the location measurement comprises a Fine Timing Measurement (FTM).

Example 109 includes the subject matter of any one of Examples 97-108, and optionally, wherein the AP comprises the link adaptation controller.

Example 110 includes the subject matter of any one of Examples 97-108, and optionally, comprising sending the first message to a first AP comprising the link adaptation controller, the first message comprising an AP identifier of a second AP.

Example 111 includes the subject matter of any one of Examples 97-110, and optionally, comprising sending the first message to a server comprising the link adaptation controller.

Example 112 includes a product comprising one or more tangible computer-readable non-transitory storage media comprising computer-executable instructions operable to, when executed by at least one computer processor, enable the at least one computer processor to implement operations at a wireless station, the operations comprising sending to a link adaption controller a first message comprising location information corresponding to a location of the wireless station, and an Access Point (AP) identifier to identify an AP; receiving from the link adaption controller a second message comprising one or more link adaptation parameters to be applied to a wireless link between the AP and the wireless station at the location; and establishing the wireless link between the AP and the wireless station according to the one or more link adaptation parameters.

Example 113 includes the subject matter of Example 112, and optionally, wherein the one or more link adaptation parameters comprise a modulation and coding scheme (MCS) for the wireless link.

Example 114 includes the subject matter of Example 112 or 113, and optionally, wherein the one or more link adaptation parameters comprise one or more Clear Channel Assessment (CCA) parameters to communicate over the wireless link.

Example 115 includes the subject matter of any one of Examples 112-114, and optionally, wherein the one or more link adaptation parameters comprise a steering matrix or a Multi User (MU) steering matrix.

Example 116 includes the subject matter of any one of Examples 112-115, and optionally, wherein the one or more link adaptation parameters comprise scheduling information to schedule communications over the wireless link.

Example 117 includes the subject matter of any one of Examples 112-116, and optionally, wherein the one or more link adaptation parameters comprise a transmit (Tx) power to transmit over the wireless link.

Example 118 includes the subject matter of any one of Examples 112-117, and optionally, wherein the one or more link adaptation parameters comprise a Number of Spatial Streams (NSS) to communicate over the wireless link.

Example 119 includes the subject matter of any one of Examples 112-118, and optionally, wherein the operations comprise sending a report to the link adaptation controller, the report comprising an indication of the location and measured radio link information corresponding to the location.

Example 120 includes the subject matter of Example 119, and optionally, wherein the measured radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 121 includes the subject matter of Example 119 or 120, and optionally, wherein the operations comprise processing a report request message from the link adaptation controller, and sending the report in response to the report request message.

Example 122 includes the subject matter of any one of Examples 112-121, and optionally, wherein the operations comprise performing a location measurement to estimate the location of the wireless station.

Example 123 includes the subject matter of Example 122, and optionally, wherein the location measurement comprises a Fine Timing Measurement (FTM).

Example 124 includes the subject matter of any one of Examples 112-123, and optionally, wherein the AP comprises the link adaptation controller.

Example 125 includes the subject matter of any one of Examples 112-123, and optionally, wherein the operations comprise sending the first message to a first AP comprising the link adaptation controller, the first message comprising an AP identifier of a second AP.

Example 126 includes the subject matter of any one of Examples 112-125, and optionally, wherein the operations comprise sending the first message to a server comprising the link adaptation controller.

Example 127 includes an apparatus of wireless communication by a wireless station, the apparatus comprising means for sending to a link adaption controller a first message comprising location information corresponding to a location of the wireless station, and an Access Point (AP) identifier to identify an AP; means for receiving from the link adaption controller a second message comprising one or more link adaptation parameters to be applied to a wireless link between the AP and the wireless station at the location; and means for establishing the wireless link between the AP and the wireless station according to the one or more link adaptation parameters.

Example 128 includes the subject matter of Example 127, and optionally, wherein the one or more link adaptation parameters comprise a modulation and coding scheme (MCS) for the wireless link.

Example 129 includes the subject matter of Example 127 or 128, and optionally, wherein the one or more link adaptation parameters comprise one or more Clear Channel Assessment (CCA) parameters to communicate over the wireless link.

Example 130 includes the subject matter of any one of Examples 127-129, and optionally, wherein the one or more link adaptation parameters comprise a steering matrix or a Multi User (MU) steering matrix.

Example 131 includes the subject matter of any one of Examples 127-130, and optionally, wherein the one or more link adaptation parameters comprise scheduling information to schedule communications over the wireless link.

Example 132 includes the subject matter of any one of Examples 127-131, and optionally, wherein the one or more link adaptation parameters comprise a transmit (Tx) power to transmit over the wireless link.

Example 133 includes the subject matter of any one of Examples 127-132, and optionally, wherein the one or more link adaptation parameters comprise a Number of Spatial Streams (NSS) to communicate over the wireless link.

Example 134 includes the subject matter of any one of Examples 127-133, and optionally, comprising means for sending a report to the link adaptation controller, the report comprising an indication of the location and measured radio link information corresponding to the location.

Example 135 includes the subject matter of Example 134, and optionally, wherein the measured radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 136 includes the subject matter of Example 134 or 135, and optionally, comprising means for processing a report request message from the link adaptation controller, and sending the report in response to the report request message.

Example 137 includes the subject matter of any one of Examples 127-136, and optionally, comprising means for performing a location measurement to estimate the location of the wireless station.

Example 138 includes the subject matter of Example 137, and optionally, wherein the location measurement comprises a Fine Timing Measurement (FTM).

Example 139 includes the subject matter of any one of Examples 127-138, and optionally, wherein the AP comprises the link adaptation controller.

Example 140 includes the subject matter of any one of Examples 127-138, and optionally, comprising means for sending the first message to a first AP comprising the link adaptation controller, the first message comprising an AP identifier of a second AP.

Example 141 includes the subject matter of any one of Examples 127-140, and optionally, comprising means for sending the first message to a server comprising the link adaptation controller.

Example 142 includes an apparatus comprising circuitry and logic configured to cause an Access Point (AP) to query a Location-Based Link Status (LB-LS) database (DB) for radio link information corresponding to a location of a wireless station; determine, based on the radio link information, one or more link adaptation parameters corresponding to a wireless link between the AP and the wireless station; and transmit a transmission to the wireless station over the wireless link according to the one or more link adaptation parameters.

Example 143 includes the subject matter of Example 142, and optionally, wherein the apparatus is configured to cause the AP to determine the one or more link adaptation parameters based on a location of the AP.

Example 144 includes the subject matter of Example 142 or 143, and optionally, wherein the apparatus is configured to cause the AP to process a message from the wireless station, the message comprising location information corresponding to the location of the wireless station.

Example 145 includes the subject matter of any one of Examples 142-144, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 146 includes the subject matter of any one of Examples 142-145, and optionally, wherein the one or more link adaptation parameters comprise a modulation and coding scheme (MCS) for the wireless link.

Example 147 includes the subject matter of any one of Examples 142-146, and optionally, wherein the one or more link adaptation parameters comprise one or more Clear Channel Assessment (CCA) parameters to communicate over the wireless link.

Example 148 includes the subject matter of any one of Examples 142-147, and optionally, wherein the one or more link adaptation parameters comprise a steering matrix or a Multi User (MU) steering matrix.

Example 149 includes the subject matter of any one of Examples 142-148, and optionally, wherein the one or more link adaptation parameters comprise scheduling information to schedule communications over the wireless link.

Example 150 includes the subject matter of any one of Examples 142-149, and optionally, wherein the one or more link adaptation parameters comprise a transmit (Tx) power to transmit over the wireless link.

Example 151 includes the subject matter of any one of Examples 142-150, and optionally, wherein the one or more link adaptation parameters comprise a Number of Spatial Streams (NSS) to communicate over the wireless link.

Example 152 includes the subject matter of any one of Examples 142-151, and optionally, comprising the LB-LS DB.

Example 153 includes the subject matter of Example 152, and optionally, wherein the apparatus is configured to process a plurality of reports from one or more wireless stations corresponding to a plurality of locations, and to update the LB-LS DB based on the reports, the plurality of reports corresponding to a plurality of locations, a report of the plurality of reports comprising an indication of a location and measured radio link information corresponding to the location.

Example 154 includes the subject matter of any one of Examples 142-151, and optionally, wherein the apparatus is configured to query a server for the radio link information.

Example 155 includes the subject matter of any one of Examples 142-154, and optionally, comprising one or more antennas, a memory and a processor.

Example 156 includes a system of wireless communication comprising an Access Point (AP), the AP comprising one or more antennas; a memory; a processor; and a controller configured to cause the AP to query a Location-Based Link Status (LB-LS) database (DB) for radio link information corresponding to a location of a wireless station; determine, based on the radio link information, one or more link adaptation parameters corresponding to a wireless link between the AP and the wireless station; and transmit a transmission to the wireless station over the wireless link according to the one or more link adaptation parameters.

Example 157 includes the subject matter of Example 156, and optionally, wherein the controller is configured to cause the AP to determine the one or more link adaptation parameters based on a location of the AP.

Example 158 includes the subject matter of Example 156 or 157, and optionally, wherein the controller is configured to cause the AP to process a message from the wireless station, the message comprising location information corresponding to the location of the wireless station.

Example 159 includes the subject matter of any one of Examples 156-158, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 160 includes the subject matter of any one of Examples 156-159, and optionally, wherein the one or more link adaptation parameters comprise a modulation and coding scheme (MCS) for the wireless link.

Example 161 includes the subject matter of any one of Examples 156-160, and optionally, wherein the one or more link adaptation parameters comprise one or more Clear Channel Assessment (CCA) parameters to communicate over the wireless link.

Example 162 includes the subject matter of any one of Examples 156-161, and optionally, wherein the one or more link adaptation parameters comprise a steering matrix or a Multi User (MU) steering matrix.

Example 163 includes the subject matter of any one of Examples 156-162, and optionally, wherein the one or more link adaptation parameters comprise scheduling information to schedule communications over the wireless link.

Example 164 includes the subject matter of any one of Examples 156-163, and optionally, wherein the one or more link adaptation parameters comprise a transmit (Tx) power to transmit over the wireless link.

Example 165 includes the subject matter of any one of Examples 156-164, and optionally, wherein the one or more link adaptation parameters comprise a Number of Spatial Streams (NSS) to communicate over the wireless link.

Example 166 includes the subject matter of any one of Examples 156-165, and optionally, wherein the AP comprises the LB-LS DB.

Example 167 includes the subject matter of Example 166, and optionally, wherein the controller is configured to process a plurality of reports from one or more wireless stations corresponding to a plurality of locations, and to update the LB-LS DB based on the reports, the plurality of reports corresponding to a plurality of locations, a report of the plurality of reports comprising an indication of a location and measured radio link information corresponding to the location.

Example 168 includes the subject matter of any one of Examples 156-165, and optionally, wherein the controller is configured to query a server for the radio link information.

Example 169 includes a method to be performed by an Access Point (AP), the method comprising querying a Location-Based Link Status (LB-LS) database (DB) for radio link information corresponding to a location of a wireless station; determining, based on the radio link information, one or more link adaptation parameters corresponding to a wireless link between the AP and the wireless station; and transmitting a transmission to the wireless station over the wireless link according to the one or more link adaptation parameters.

Example 170 includes the subject matter of Example 169, and optionally, comprising determining the one or more link adaptation parameters based on a location of the AP.

Example 171 includes the subject matter of Example 169 or 170, and optionally, comprising processing a message from the wireless station, the message comprising location information corresponding to the location of the wireless station.

Example 172 includes the subject matter of any one of Examples 169-171, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 173 includes the subject matter of any one of Examples 169-172, and optionally, wherein the one or more link adaptation parameters comprise a modulation and coding scheme (MCS) for the wireless link.

Example 174 includes the subject matter of any one of Examples 169-173, and optionally, wherein the one or more link adaptation parameters comprise one or more Clear Channel Assessment (CCA) parameters to communicate over the wireless link.

Example 175 includes the subject matter of any one of Examples 169-174, and optionally, wherein the one or more link adaptation parameters comprise a steering matrix or a Multi User (MU) steering matrix.

Example 176 includes the subject matter of any one of Examples 169-175, and optionally, wherein the one or more link adaptation parameters comprise scheduling information to schedule communications over the wireless link.

Example 177 includes the subject matter of any one of Examples 169-176, and optionally, wherein the one or more link adaptation parameters comprise a transmit (Tx) power to transmit over the wireless link.

Example 178 includes the subject matter of any one of Examples 169-177, and optionally, wherein the one or more link adaptation parameters comprise a Number of Spatial Streams (NSS) to communicate over the wireless link.

Example 179 includes the subject matter of any one of Examples 169-178, and optionally, comprising processing a plurality of reports from one or more wireless stations corresponding to a plurality of locations, and updating the LB-LS DB based on the reports, the plurality of reports corresponding to a plurality of locations, a report of the plurality of reports comprising an indication of a location and measured radio link information corresponding to the location.

Example 180 includes the subject matter of any one of Examples 169-177, and optionally, comprising querying a server for the radio link information.

Example 181 includes a product comprising one or more tangible computer-readable non-transitory storage media comprising computer-executable instructions operable to, when executed by at least one computer processor, enable the at least one computer processor to implement operations comprising querying a Location-Based Link Status (LB-LS) database (DB) for radio link information corresponding to a location of a wireless station; determining, based on the radio link information, one or more link adaptation parameters corresponding to a wireless link between the AP and the wireless station; and transmitting a transmission to the wireless station over the wireless link according to the one or more link adaptation parameters.

Example 182 includes the subject matter of Example 181, and optionally, wherein the operations comprise determining the one or more link adaptation parameters based on a location of the AP.

Example 183 includes the subject matter of Example 181 or 182, and optionally, wherein the operations comprise processing a message from the wireless station, the message comprising location information corresponding to the location of the wireless station.

Example 184 includes the subject matter of any one of Examples 181-183, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 185 includes the subject matter of any one of Examples 181-184, and optionally, wherein the one or more link adaptation parameters comprise a modulation and coding scheme (MCS) for the wireless link.

Example 186 includes the subject matter of any one of Examples 181-185, and optionally, wherein the one or more link adaptation parameters comprise one or more Clear Channel Assessment (CCA) parameters to communicate over the wireless link.

Example 187 includes the subject matter of any one of Examples 181-186, and optionally, wherein the one or more link adaptation parameters comprise a steering matrix or a Multi User (MU) steering matrix.

Example 188 includes the subject matter of any one of Examples 181-187, and optionally, wherein the one or more link adaptation parameters comprise scheduling information to schedule communications over the wireless link.

Example 189 includes the subject matter of any one of Examples 181-188, and optionally, wherein the one or more link adaptation parameters comprise a transmit (Tx) power to transmit over the wireless link.

Example 190 includes the subject matter of any one of Examples 181-189, and optionally, wherein the one or more link adaptation parameters comprise a Number of Spatial Streams (NSS) to communicate over the wireless link.

Example 191 includes the subject matter of any one of Examples 181-190, and optionally, wherein the operations comprise processing a plurality of reports from one or more wireless stations corresponding to a plurality of locations, and updating the LB-LS DB based on the reports, the plurality of reports corresponding to a plurality of locations, a report of the plurality of reports comprising an indication of a location and measured radio link information corresponding to the location.

Example 192 includes the subject matter of any one of Examples 181-189, and optionally, wherein the operations comprise querying a server for the radio link information.

Example 193 includes a apparatus of wireless communication by an Access Point (AP), the apparatus comprising means for querying a Location-Based Link Status (LB-LS) database (DB) for radio link information corresponding to a location of a wireless station; means for determining, based on the radio link information, one or more link adaptation parameters corresponding to a wireless link between the AP and the wireless station; and means for transmitting a transmission to the wireless station over the wireless link according to the one or more link adaptation parameters.

Example 194 includes the subject matter of Example 193, and optionally, comprising means for determining the one or more link adaptation parameters based on a location of the AP.

Example 195 includes the subject matter of Example 193 or 194, and optionally, comprising means for processing a message from the wireless station, the message comprising location information corresponding to the location of the wireless station.

Example 196 includes the subject matter of any one of Examples 193-195, and optionally, wherein the radio link information comprises at least one parameter selected from a group consisting of a Carrier to Interference Noise Ratio (CINR) at the location, a Received Signal Strength Indicator (RSSI) at the location, and a Signal to Noise Ratio (SNR) at the location.

Example 197 includes the subject matter of any one of Examples 193-196, and optionally, wherein the one or more link adaptation parameters comprise a modulation and coding scheme (MCS) for the wireless link.

Example 198 includes the subject matter of any one of Examples 193-197, and optionally, wherein the one or more link adaptation parameters comprise one or more Clear Channel Assessment (CCA) parameters to communicate over the wireless link.

Example 199 includes the subject matter of any one of Examples 193-198, and optionally, wherein the one or more link adaptation parameters comprise a steering matrix or a Multi User (MU) steering matrix.

Example 200 includes the subject matter of any one of Examples 193-199, and optionally, wherein the one or more link adaptation parameters comprise scheduling information to schedule communications over the wireless link.

Example 201 includes the subject matter of any one of Examples 193-200, and optionally, wherein the one or more link adaptation parameters comprise a transmit (Tx) power to transmit over the wireless link.

Example 202 includes the subject matter of any one of Examples 193-201, and optionally, wherein the one or more link adaptation parameters comprise a Number of Spatial Streams (NSS) to communicate over the wireless link.

Example 203 includes the subject matter of any one of Examples 193-202, and optionally, comprising means for processing a plurality of reports from one or more wireless stations corresponding to a plurality of locations, and updating the LB-LS DB based on the reports, the plurality of reports corresponding to a plurality of locations, a report of the plurality of reports comprising an indication of a location and measured radio link information corresponding to the location.

Example 204 includes the subject matter of any one of Examples 193-201,and optionally, comprising means for querying a server for the radio link information.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and Logic configured to:
    process a plurality of reports from one or more reporting stations corresponding to a plurality of locations and update Location-Based Link Status (LB-LS) database (DB) based on said reports, are a report of the plurality of reports comprising an indication of a reported location and measured radio link information corresponding to the reported location;
    process a first message from a wireless station, the first message comprising location information corresponding to a location of said wireless station, and an Access Point (AP) identifier to identify an AP for communication with the wireless station;
    based on both the location of the wireless station and the AP identifier of the AP for communication with the wireless station, query the LB-LS DB for radio link information corresponding to said AP and to said location of said wireless station;
    based on said radio link information corresponding to the location of the wireless station and to the AP for communication with the wireless station, determine one or more link adaptation parameters corresponding to a wireless link between said AP and said wireless station at said location of the wireless station; and
    send to the wireless station a second message comprising the one or more link adaptation parameters.

2. The apparatus of claim 1, wherein the radio link information comprises at least one parameter selected from a group consisting of a Carrier to Interference Noise Ratio (CINR) at said location, a Received Signal Strength Indicator (RSSI) at said location, and a Signal to Noise Ratio (SNR) at said location.

3. The apparatus of claim 1, wherein the one or more link adaptation parameters comprise a modulation and coding scheme (MCS) for said wireless link.

4. The apparatus of claim 1, wherein the one or more link adaptation parameters comprise one or more Clear Channel Assessment (CCA) parameters to communicate over said wireless link.

5. The apparatus of claim 1, wherein the one or more link adaptation parameters comprise a steering matrix or a Multi User (MU) steering matrix.

6. The apparatus of claim 1, wherein the one or more link adaptation parameters comprise scheduling information to schedule communications over said wireless link.

7. The apparatus of claim 1, wherein the one or more link adaptation parameters comprise a transmit (Tx) power to transmit over said wireless link.

8. The apparatus of claim 1, wherein the one or more link adaptation parameters comprise a Number of Spatial Streams (NSS) to communicate over said wireless link.

9. The apparatus of claim 1 comprising said LB-LS DB.

10. The apparatus of claim 1, wherein said link adaptation parameters comprise link adaptation parameters of a neighbor AP for handover of said wireless station.

11. The apparatus of claim 1 configured to query a server for said radio link information.

12. The apparatus of claim 1 comprising said AP.

13. The apparatus of claim 1 configured to receive said first message from said wireless station via said AP, and to send said second message to the wireless station via said AP.

14. The apparatus of claim 1 comprising one or more antennas, a memory and a processor.

15. A product comprising one or more tangible computer-readable non-transitory storage media comprising computer-executable instructions operable to, when executed by at least one computer processor, enable the at least one computer processor to:
    process a plurality of reports from one or more reporting stations corresponding to a plurality of locations and update a Location-Based Link, Status (LB-LS) database (DB) based on said reports, a report of the plurality of reports compromising an indication of a reported location and measured radio link information corresponding to the reported location;

process a first message from a wireless station, the first message comprising location information corresponding to a location of said wireless station, and an Access Point (AP) identifier to identify an AP for communication with the wireless station;

based on both the location of the wireless station and the AP identifier of the AP or communication with the wireless station, query the LB-LS DB for radio link information corresponding to said AP and to said location of said wireless station;

based on said radio link information corresponding to the location of the wireless station and to the AP for communication with the wireless station, determine one or more link adaptation parameters corresponding to a wireless link between said AP and said wireless station at said location of the wireless station; and send to the wireless station a second message comprising the one or more link adaptation parameters.

16. The product of claim 15, wherein the radio link information comprises at least one parameter selected from a group consisting of a Carrier to Interference Noise Ratio (CINR) at said location, a Received Signal Strength Indicator (RSSI) at said location, and a Signal to Noise Ratio (SNR) at said location.

17. The product of claim 15, wherein said link adaptation parameters comprise link adaptation parameters of a neighbor AP for handover of said wireless station.

* * * * *

UNITED STATES PATENT AND TRADEMARK OFFICE
CERTIFICATE OF CORRECTION

PATENT NO. : 10,123,375 B2
APPLICATION NO. : 15/200026
DATED : November 6, 2018
INVENTOR(S) : Jonathan Segev et al.

Page 1 of 1

It is certified that error appears in the above-identified patent and that said Letters Patent is hereby corrected as shown below:

In the Claims

In Column 41, Line 63, in Claim 1, delete "update Location-Based" and insert -- update a Location-Based --, therefor.

In Column 41, Line 64, in Claim 1, delete "reports, are a report" and insert -- reports, a report --, therefor.

In Column 42, Line 63, in Claim 15, delete "Location-Based Link, Status" and insert -- Location-Based Link Status --, therefor.

In Column 42, Line 65, in Claim 15, delete "reports compromising an" and insert -- reports comprising an --, therefor.

In Column 43, Line 7, in Claim 15, delete "AP or communication" and insert -- AP for communication --, therefor.

Signed and Sealed this
Twenty-ninth Day of January, 2019

Andrei Iancu
*Director of the United States Patent and Trademark Office*